(12) United States Patent
Aoki

(10) Patent No.: US 11,288,224 B2
(45) Date of Patent: Mar. 29, 2022

(54) SEMICONDUCTOR SYSTEM AND SEMICONDUCTOR DEVICE

(71) Applicant: RENESAS ELECTRONICS CORPORATION, Tokyo (JP)

(72) Inventor: Dan Aoki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/860,915

(22) Filed: Apr. 28, 2020

(65) Prior Publication Data

US 2020/0379937 A1   Dec. 3, 2020

(30) Foreign Application Priority Data

May 29, 2019 (JP) .............................. JP2019-099978

(51) Int. Cl.
*G06F 13/40* (2006.01)
*G06F 1/28* (2006.01)
*G06F 13/42* (2006.01)

(52) U.S. Cl.
CPC ............ *G06F 13/4068* (2013.01); *G06F 1/28* (2013.01); *G06F 13/4282* (2013.01); *G06F 2213/0016* (2013.01); *G06F 2213/0042* (2013.01)

(58) Field of Classification Search
CPC ..... G06F 13/4068; G06F 1/28; G06F 13/4282
USPC .......................................... 710/105, 302, 304
See application file for complete search history.

(56) References Cited

U.S. PATENT DOCUMENTS

| | | | | |
|---|---|---|---|---|
| 4,835,737 A | * | 5/1989 | Herrig | G06F 13/4081 710/302 |
| 5,386,567 A | * | 1/1995 | Lien | G06F 9/4411 710/302 |
| 5,644,731 A | * | 7/1997 | Liencres | H02J 1/14 710/302 |
| 5,664,118 A | * | 9/1997 | Nishigaki | G06F 1/1632 710/304 |
| 5,721,836 A | * | 2/1998 | Scharnberg | G06F 1/1632 710/303 |
| 5,787,261 A | * | 7/1998 | Osaka | G06F 13/4081 710/100 |

(Continued)

OTHER PUBLICATIONS

Universal Serial Bus Type-C Cable and Connector Specification, Release 1.4, Mar. 29, 2019.

(Continued)

*Primary Examiner* — Paul R. Myers
(74) *Attorney, Agent, or Firm* — McDermott Will & Emery LLP

(57) ABSTRACT

A semiconductor system capable of reducing processing time in connection processing to a USB port is provided. The semiconductor system comprises TCPM and TCPC. The TCPM and the TCPC are communicably connected via the I2C bus. The TCPM has a connection detector. The TCPC in a CC logic and a controller. The CC logic embodies a state machine. The controller controls transitions in the state machine. The controller outputs a connected state transition notification when the connected state transitions to the connected state. The connection detector receives the connected state transition notification and detects the connection of the USB port. The TCPM performs a process corresponding to the connection detection by the connection detector.

18 Claims, 15 Drawing Sheets

(56) References Cited

U.S. PATENT DOCUMENTS

| | | | | |
|---|---|---|---|---|
| 5,790,958 | A * | 8/1998 | McCoy | H04H 60/27 455/161.1 |
| 6,073,196 | A * | 6/2000 | Goodrum | G06F 13/4081 710/302 |
| 6,662,119 | B1 * | 12/2003 | Mitchell | H05K 7/1459 702/187 |
| 7,414,335 | B2 * | 8/2008 | Hussein | H02H 9/00 307/135 |
| 8,612,634 | B2 * | 12/2013 | Kweon | H04L 12/282 710/5 |
| 2006/0066573 | A1 * | 3/2006 | Matsumoto | H04L 67/16 345/158 |
| 2008/0005258 | A1 * | 1/2008 | Sridharan | H04L 49/90 709/212 |
| 2011/0131344 | A1 * | 6/2011 | Kweon | H04L 12/282 710/5 |
| 2012/0246523 | A1 * | 9/2012 | Anne | H04L 41/12 714/48 |
| 2014/0208134 | A1 * | 7/2014 | Waters | G06F 13/4282 713/310 |
| 2015/0309954 | A1 * | 10/2015 | Moore | G06F 13/382 710/316 |
| 2017/0139467 | A1 * | 5/2017 | Waters | G06F 13/4282 |
| 2018/0148045 | A1 * | 5/2018 | Lee | B60W 40/10 |
| 2018/0189223 | A1 * | 7/2018 | Nge | G06F 1/266 |
| 2019/0213159 | A1 * | 7/2019 | Hsu | G06F 13/385 |
| 2020/0119540 | A1 * | 4/2020 | Buhari | G06F 13/4282 |

OTHER PUBLICATIONS

Universal Serial Bus Type-C™ Port Controller Interface Specification, Revision 2.0, Version 1.0, Oct. 2017.

* cited by examiner

SEMICONDUCTOR SYSTEM AND SEMICONDUCTOR DEVICE

CROSS-REFERENCE TO RELATED APPLICATIONS

The disclosure of Japanese Patent Application No. 2019-099978 filed on May 29, 2019 including the specification, drawings and abstract is incorporated herein by reference in its entirety.

BACKGROUND

The present invention relates to a semiconductor system and a semiconductor device, for example, the present invention relates to a semiconductor system and a semiconductor device for controlling Universal Serial Bus ports.

There are disclosed techniques listed below.
[Non Patent Document 1] Universal Serial Bus Type-C Cable and Connector Specification, Release 1.4, Mar. 29, 2019
[Non Patent Document 2] Universal Serial Bus Type-CTM Port Controller Interface Specification, Revision 2.0, Version 1.0, October 2017

Recently, USB ports conforming to USB Type-C (registered trademark) specifications (Non Patent Document 1) have been adopted. Here, in the specifications according to Non Patent Document 1, one Power Delivery Controller is required for each of the ports.

Here, there is a Type-C Port Controller Interface (TCPCI specification (Non Patent Document 2) as a specification of controllers for Type-C. The Port Manager (Type-C Port Manager; TCPM) and Port Controller (Type-C Port Controller; TCPC) are specified in the specifications for Non Patent Document 2. In Non Patent Document 2 specifications, system can be built with one port manager and one or more port controllers per port.

SUMMARY

However, in the art according to the non Patent Document 2, as described below, there is a possibility that the processing time in the process of connecting to the USB ports may be increased. In the above-described system of the non Patent Document 2, the port manager and the port controllers are connected by I2C (Inter-Integrated Circuit) buses. In the non Patent Document 2 system, the port manager and the port controller communicate in the process of connecting to the USB port. Therefore, in the connection processing to the USB port, the communication time between the port manager and the port controller via the I2C bus may be a bottleneck. Therefore, as the number of ports increases, communication time may increase. Other objects and novel features will become apparent from the description of this specification and the accompanying drawings.

According to one embodiment, a semiconductor system comprises a port controller configured to control a USB (Universal Serial Bus) port, and a port manager configured to control the port controller and being connected to the port controller via a I2C bus, wherein the port controller comprises a state machine configured to realize transition of a connection state in the USB port, and a controller configured to control transition in the state machine and output a connected state transition notification when the connection state transitions to a connected state that is a state in which the connection state is electrically stably connected, wherein the port manager comprises a connection detection unit configured to receive the connected state transition notification and detect a connection of the USB port, and wherein the port manager performs a process according to a connection detected by the connection detection unit.

According to one embodiment, A semiconductor device comprises an interface configured to be connected to a port controller which control a USB (Universal Serial Bus) port via a bus, and a connection detector configured to receive a notification transmitted from the port controller and detect a connection of the USB port, and wherein the semiconductor device performs a process according to the connection detected by the connection detector.

According to the embodiments, a semiconductor system and a semiconductor device capable of reducing a processing time in connecting a USB port can be provided.

DETAILED DESCRIPTION

Figure 1:
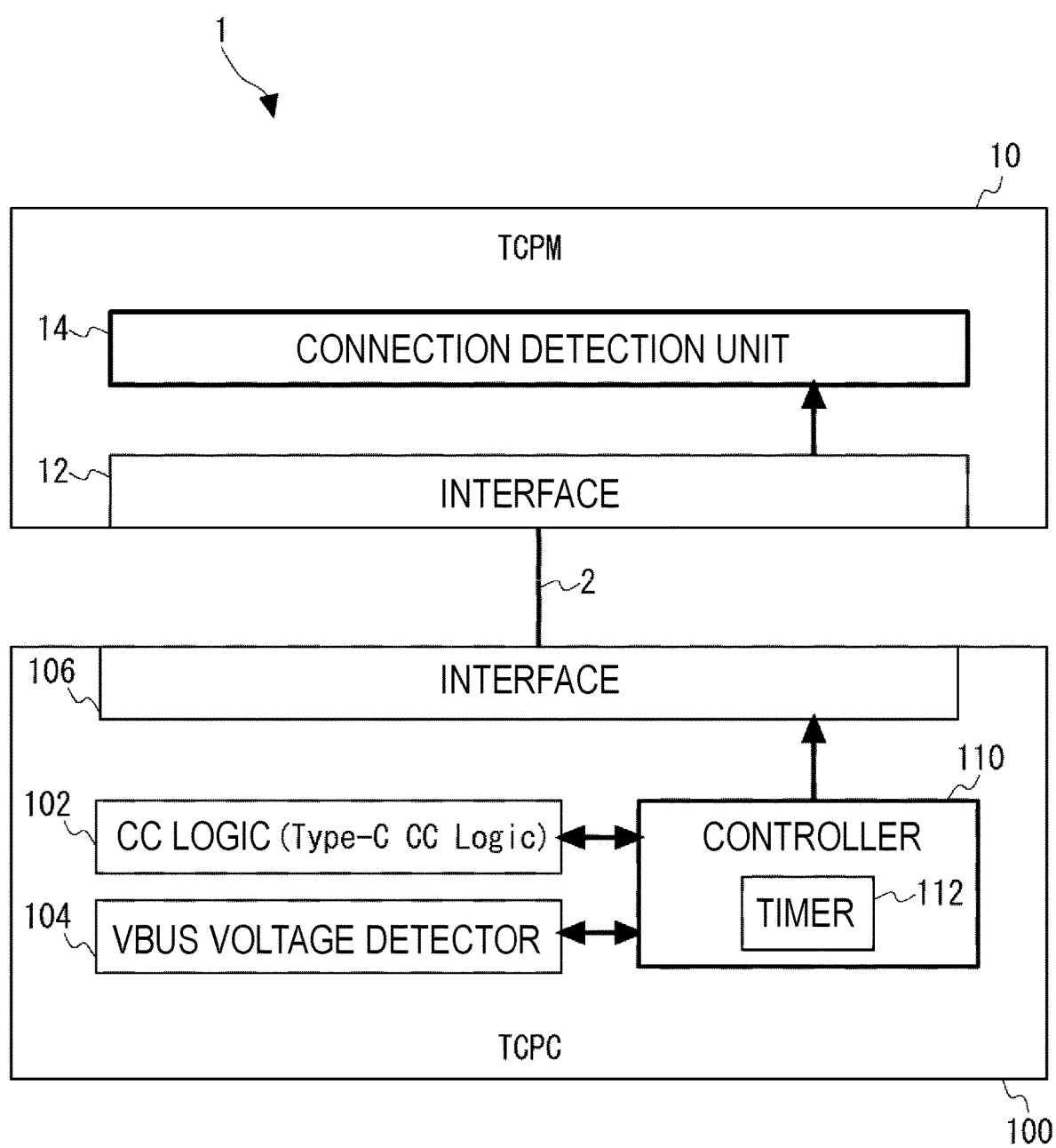
FIG. 1 is a diagram showing a configuration of a semiconductor system according to a first embodiment.

Embodiments will be described below with reference to the drawings. For clarity of explanation, the following description and drawings are appropriately omitted and simplified. In the drawings, the same elements are denoted by the same reference numerals, and a repetitive description thereof is omitted as necessary.

In the following embodiments, if necessary for convenience, it will be described by dividing into sections or embodiments. However, unless expressly stated otherwise, they are not independent of each other, and one is in the context of some or all of the other modified example, applications, detailed descriptions, supplementary descriptions, and the like. In the following embodiments, reference to the number of elements or the like (including the number, numerical value, quantity, range, and the like) is not limited to the identification number except for the case where it is specifically specified and the case where it is obviously limited to the specific number in principle. That is, the number of elements may be greater than or equal to a specific number.

Furthermore, in the following embodiments, the constituent elements (including the operation steps and the like) are not necessarily essential except in the case where they are specifically specified and the case where they are considered to be obviously essential in principle. Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above-mentioned numbers and the like, including the number, the numerical value, the amount, the range, and the like.

In addition, the elements described in the drawings as functional blocks for performing various processes can be configured by CPUs (Central Processing Unit), memories, and other circuits in terms of hardware. Further, each of the above-described elements is realized in software by a program loaded into the memory or the like. Therefore, it is understood by those skilled in the art that these functional blocks can be realized in various forms by hardware alone, software alone, or a combination thereof, and the present invention is not limited to any of them.

Also, the programs described above may be stored and provided to a computer using various types of non-transitory computer readable media. Non-transitory computer readable media includes various types of tangible storage media. Examples of non-transitory computer-readable media include magnetic recording media (e.g., flexible disks, magnetic tapes, hard disk drives), magneto-optical recording media (e.g., magneto-optical disks), CD-ROM (Read Only Memory, a CD-R, a CD-R/W, solid-state memories (e.g., masked ROM, PROM (Programmable ROM), EPROM (Erasable PROM, flash ROM, RAM (Random Access Memory)). The program may also be supplied to the computer by various types of transitory computer-readable media. Examples of transitory computer-readable media include electrical signals, optical signals, and electromagnetic waves. The transitory computer readable medium may provide the program to the computer via wired or wireless communication paths, such as electrical wires and optical fibers.

First Embodiment

FIG. 1 is a diagram showing a configuration of a semiconductor system 1 according to the first embodiment. The semiconductor system 1 is mounted on a device having a USB port, such as a personal computer and a smartphone. The semiconductor system 1 according to the first embodiment has the TCPM 10 (port manager) and a TCPC 100 (port controller). The TCPM 10 and the TCPC 100 are communicably connected via an I2C bus 2 (Inter-Integrated Circuit bus). The TCPM 10 can be realized by, for example, a microcomputer. The TCPC 100 may be mounted on a separate Integrated Circuit from the TCPM 10. In other words, the TCPM 10 and the TCPC 100 are semiconductor devices. The TCPC 100 controls the USB port. The TCPM 10 controls the TCPC 100.

The TCPC 100 is connected to a USB port (Type-C connector) (not shown in FIG. 1). The TCPC 100 is provided for each USB port. Thus, for example, if there are two USB ports, two TCPC 100 can be provided in the semiconductor system 1. That is, in FIG. 1, although the semiconductor system 1 has one TCPC 100, the number of TCPC 100 is not limited to one. On the other hand, one TCPM 10 may be provided in the semiconductor system 1. Incidentally, if the device has a number of USB ports (e.g., 10 ports), for the device, the TCPM 10 may be provided two or more.

The TCPM 10 includes an interface 12 and a connection detection unit 14. The TCPC 100 has a CC logic 102, a VBUS voltage detector 104, an interface 106, and a controller 110. The controller 110 has a timer 112. The TCPM 10 may have components (e.g., a Policy Engine) related to power Power Delivery (PD). Likewise, the TCPC 100 may have a power supply-related component, such as a Physical Layer. Also, the interface 12, the CC logic 102, the VBUS voltage detector 104, and the interface 106 are not essential components in the semiconductor system 1 in accordance with present embodiment.

The interface 12 functions as an I2C master. The interface 106 acts as an I2C slave. The VBUS voltage detector 104 detects the voltage of VBUS lines (bus voltage lines) of the corresponding USB port. The VBUS voltage detector 104, when detecting the voltage of VBUS line, to the controller 110, and outputs a voltage detection signal.

The CC logic 102 corresponds to Type-C CC logic in TCPCI specifications (non Patent Document 2). The CC logic 102 realizes a state machine. Here, the state machine transitions the state (connection state) in the USB port. Specifically, the CC logic 102 according to present embodiment performs at least a process for transition among "disconnected state", "connection confirmation state", and "connected state".

Here, the "disconnected state" is a state in which there is no connection (via Type-C cable) with an opposite device to the USB port. The "connection confirmation state" is a state in which it is confirmed whether or not the USB port is electrically stably connected to the opposite device. The "connected state" is a state in which an electrically stable connection is made to the USB port. Also, as indicated in Type-C specifications, the USB port can act as sink (SNK) or source (SRC) depending on the opposite device. Each connection state then has a different state, depending on whether the USB port functions as a sink or as a source.

Note that the "disconnected state" may correspond to the "Unattached" state (the "Unattached.SNK" state and the "Unattached.SRC" state) in Type-C specifications (non Patent Document 1). The "disconnected state" may correspond to the "Apply Rd" and "Apply Rp" states in TCPCI specifications. Thereafter, the "Apply Rd" and "Apply Rp" states may be collectively referred to as the "Apply" states.

In addition, the "connection confirmation state" may correspond to the "AttachWait" state (the "AttachWait. SNK" state) and the "AttachWait. SRC" state) in Type-C specifications. The "connection confirmation state" may correspond to the "Potential_Connect_As_Snk" and "Potential_Connect_As_Src" states in TCPCI specifications. Thereafter, the Potential_Connect_As_Snk state and Potential_Connect_As_Src state are sometimes collectively referred to as the Potential_Connect state.

Also, the "connected state" may correspond to the "Attached" state (the "Attached.SNK" state and the "Attached.SRC" state) in Type-C specifications. Also, the ""connected state"" may correspond to the ""Attached"" state (""Attached. Snk"" and ""Attached. Src"" states) in TCPCI specifications.

More specifically, the CC logic 102 controls the CC (Configuration Channel) signals of Type-C connector (USB port) in accordance with Type-C specifications. Then, the CC logic 102 detects the state (connection state) of the USB port. According to Type-C specifications, the CC logic 102 controls the two CC signals (CC1 signal and CC2 signal), Rp (Pullup resistor) connection or Rd (Pulldown resistance) connection.

At this time, it is assumed that the opposite device (consumer) having the sink function controls a CC signal to be Rd connection (i.e., on the sink side). In this case, when the CC logic 102 controls the CC signal to the Rd connection, the voltage of the resistor Rd falls to a ground level, a state in which is not divided by the resistor Rp and the resistor Rd. At this time, the CC logic 102 does not detect that the opposite device is connected. On the other hand, when the CC logic 102 controls the CC signal to the Rp connection, the potential in the CC signal is a state of being divided by the resistor Rp and the resistor Rd. At this time, the CC logic 102 detects that the opposite device is connected. In other words, the connection status of the USB port changes from "disconnected state" to "connection confirmation state". Then, the CC logic 102 outputs a state detection signal indicating that the opposite device is connected, that is, the "connection confirmation state" is detected, to the controller 110.

It is also assumed that an opposite device (provider) having a source function controls the CC signal to be Rp-connected (i.e., on the source side). In this case, when the CC logic 102 controls the CC signal to the Rp connection, the voltage of the resistor Rp becomes a high state, a state in which is not divided by the resistor Rp and the resistor Rd. At this time, the CC logic 102 does not detect that the opposite device is connected. On the other hand, when the CC logic 102 controls the CC signal to the Rd connection, the potential in the CC signal is a state of being divided by the resistor Rp and the resistor Rd. At this time, the CC logic 102 detects that the opposite device is connected. In other words, the connection status of the USB port changes from "disconnected state" to "connection confirmation state". Then, the CC logic 102 outputs a state detection signal indicating that the opposite device is connected, that is, the "connection confirmation state" is detected, to the controller 110.

The controller 110 controls the transition of the connection state in the USB port. That is, the controller 110 controls the transition in the state machine. The controller 110 outputs a connected state transition notification (Attached state transition notification) when the connected state transitions to the connected state (Attached state). The connected state transition notification is transmitted to the connection detection unit 14 via the interface 106, the I2C bus 2, and the interface 12. The connected state transition notification may indicate whether the USB port functions as a sink or as a source.

Specifically, the controller 110, when receiving a state detection signal indicating that it has detected the "connection confirmation state" from the CC logic 102, using the timer 112, to measure the duration of the connection confirmation state. That is, the timer 112 measures the time from when the connection state transitions from the disconnected state to the connection confirmation state. Then, when the duration of the connection confirmation state has elapsed a predetermined period of time, i.e., the first period of time, the controller 110 transitions the connection state to the connected state. At this time, the controller 110 outputs the connected state transition notification. Incidentally, when the duration of the connection confirmation state has elapsed the first time, and when receiving a voltage detection signal, the controller 110 may transition to the connection state to the connected state. On the other hand, when the connection to the USB port is released before the duration of the connection confirmation state elapses a predetermined period of time, i.e., the first period of time, the controller 110 may transition the connection state to the disconnected state.

The connection detection unit 14 receives the connected state transition notification and detects the connection of the USB port. That is, the connection detection unit 14 detects that the USB port and the opposite device are electrically stably connected to each other. In addition, the connection detection unit 14 detections whether the USB port functions as a sink or as a source. At this time, the TCPM 10 performs processing corresponding to the connection detected by the connection detection unit 14, for example, processing relating to at least one of power receiving and power supply. Specifically, the TCPM 10 controls a power supply circuit or performs a Power Delivery process. Thus, if the USB port functions as a sink, power is supplied to the device on which the semiconductor system 1 is mounted via the USB port. Further, when the USB port functions as a source, the device on which the semiconductor system 1 is mounted provides power to the opposite device connected to the USB port.

Figure 2:
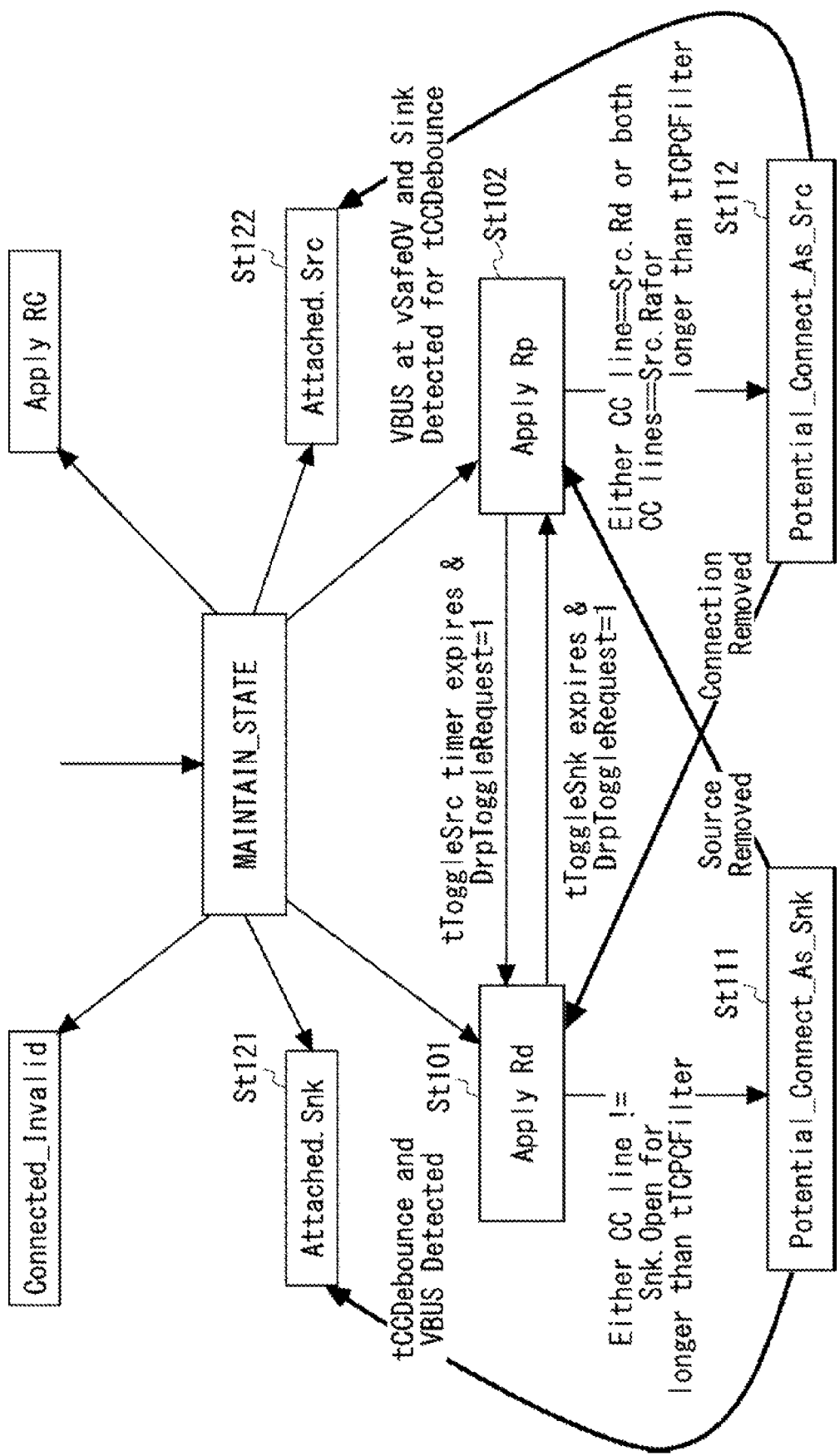
FIG. 2 is a diagram illustrating a state-transition diagram realized in the semiconductor system according to the first embodiment.
Figure 3:
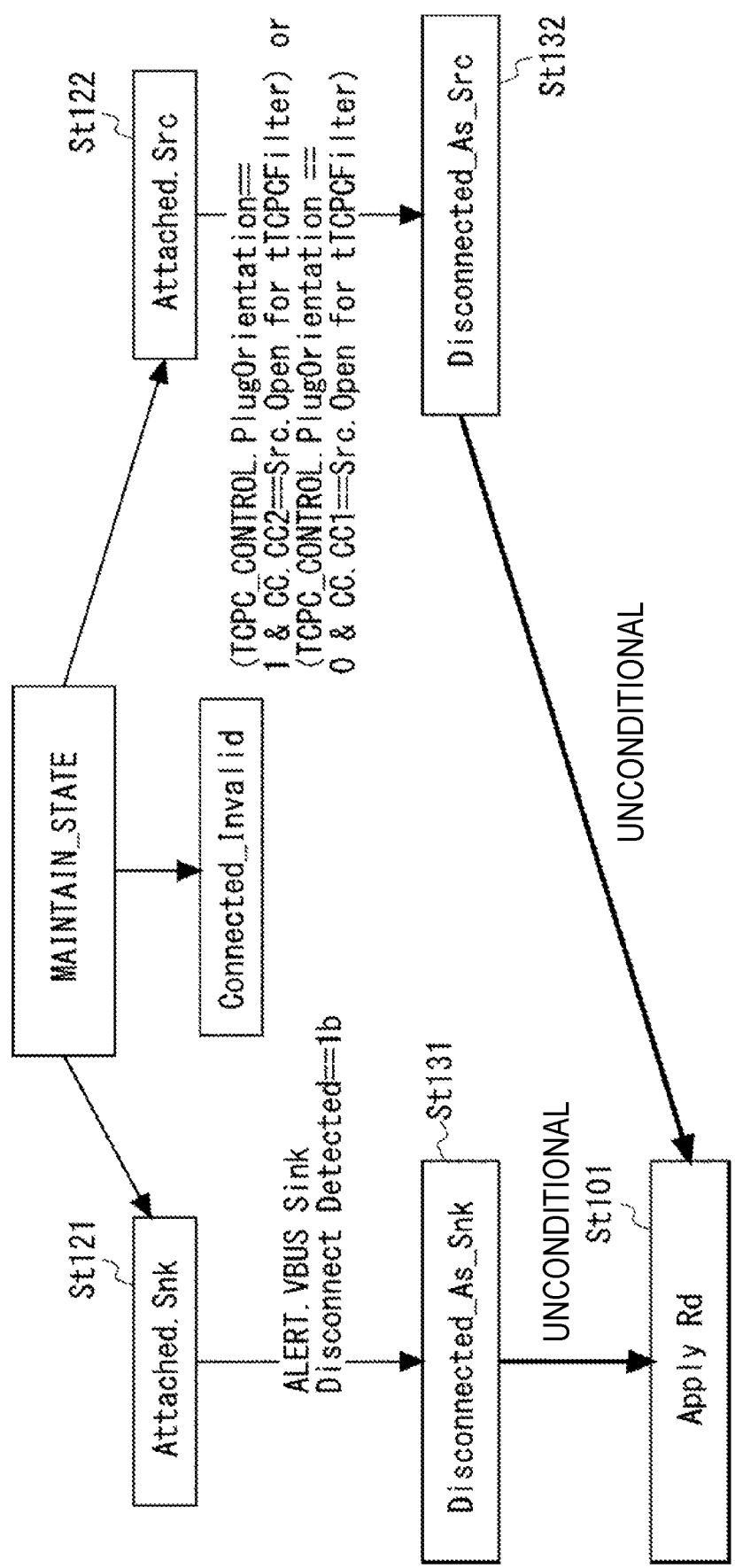
FIG. 3 is a diagram illustrating a state-transition diagram realized in the semiconductor system according to the first embodiment.

FIGS. 2 and 3 are diagrams illustrating state transition diagrams realized in the semiconductor system 1 according to the first embodiment. FIGS. 2 and 3 illustrate state transition diagrams for Dual Role Power devices in accordance with TCPCI specifications. In the state transition diagrams shown in FIGS. 2 and 3, descriptions of states and transitions unrelated to present embodiment are appropriately omitted.

FIG. 2 shows a state transition diagram until the connected state transitions to the connected state. First, the state machine (connected state) alternately transitions between the "Apply Rd" state St101 (disconnected state) and the "Apply Rp" state St102 (disconnected state) at regular intervals. That is, the state machine toggles the state between the "Apply Rd" state St101 and the "Apply Rp" state St102 at regular intervals. Note that the "Apply Rd" state St101 is a state in which the CC signal of the CC signal itself is controlled to be connected to the Rd signal. The "Apply Rp" state St102 is a state in which the CC signal of the CC signal itself is controlled to be connected to the Rp signal.

When the state machine is in the "Apply Rd" state St101, it is assumed that an opposite device having a source function is connected to the USB port, and the potential of the CC signal is divided as described above. Then, as described above, the state machine transitions to the "Potential_Connect_As_Snk" state St111. In this state, when the opposite device having a source function is removed from the USB port, the state machine enters the "Apply Rp" state St102. On the other hand, when the state in which the potential in the CC signal is divided continues for a first time (tCCDebounce) and the voltage of VBUS line is detected, the state machine transitions to the "Attached. Snk" state St121.

On the other hand, it is assumed that when the state machine is in the "Apply Rp" state St102, the opposite device having the sync function is connected to the USB port, and the potential of the CC signal is divided as described above. The state machine then transitions to the "Potential_Connect_As_Src" state St112, as described above. In this state, if the opposite device having the sync function is removed from the USB port, the state machine enters the "Apply Rd" state St101. On the other hand, if the state in which the potential in the CC signal is divided keeps during a first time (tCCDebounce) and the voltage of VBUS line is vSafe0V, the state machine transitions to the "Attached. Src" state St122.

FIG. 3 shows a state transition diagram from the connected state to the disconnected state. Assume that, when the state machine is in the "Attached.Snk" state St121, the voltages of VBUS lines are not detected, and the disconnection with the opposite device having the source function is detected. The state machine then transitions to the "Disconnected_As_Snk" state St131. The state machine then unconditionally transitions to the "Apply Rd" state St101.

It is also assumed that, when the state machine is in the "Attached.Src" state St122, a change in the status of the CC signal is detected, and disconnection of the CC signal from the opposite device having the sync function is detected. The state machine then transitions to the "Disconnected_As_Src" state St132. The state machine then unconditionally transitions to the "Apply Rd" state St101.

Figure 4:
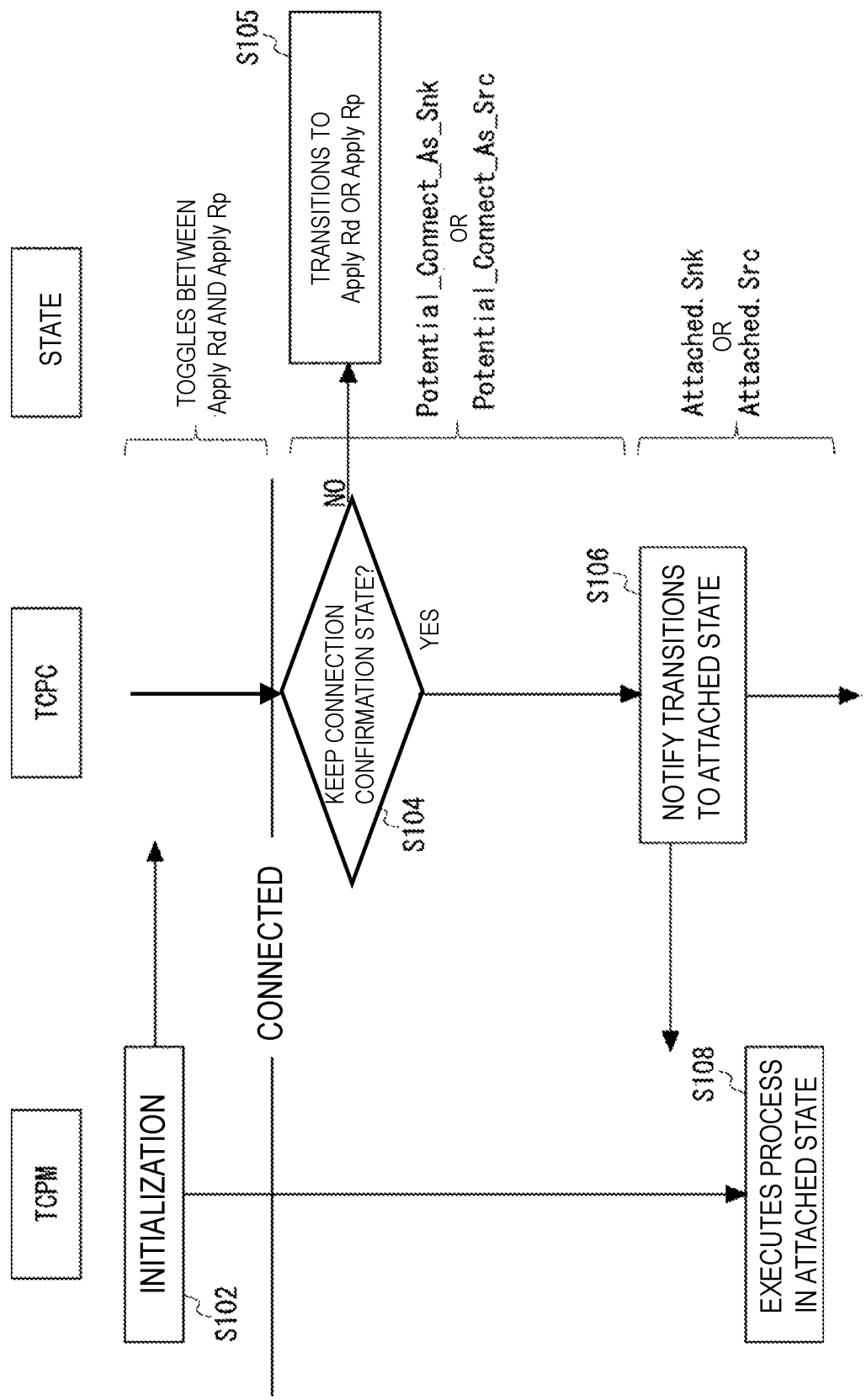
FIG. 4 is a sequential diagram showing the process performed by the semiconductor system according to the first embodiment.
Figure 5:
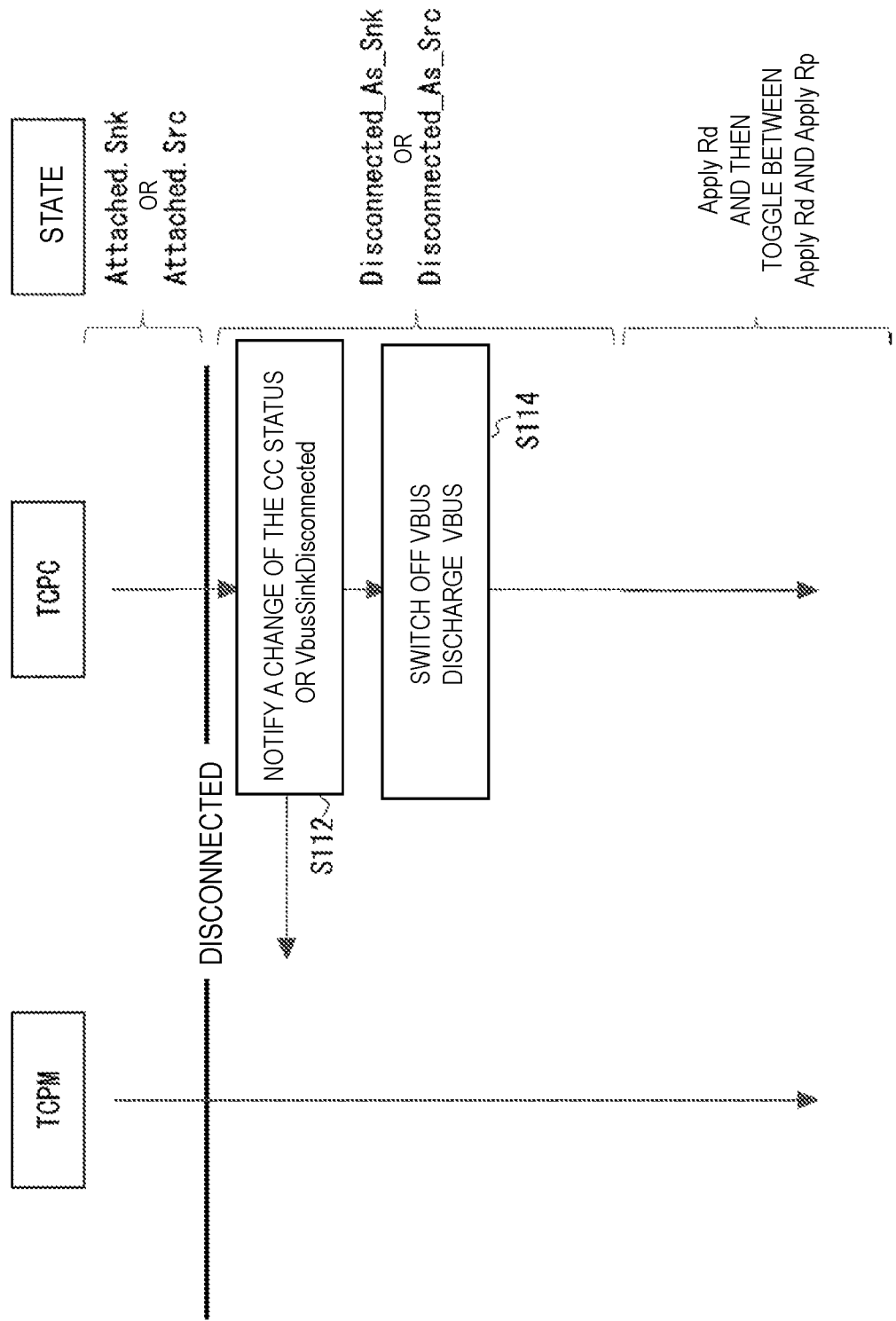
FIG. 5 is a sequential diagram showing the process performed by the semiconductor system according to the first embodiment.

FIGS. 4 and 5 are sequence diagrams showing processes executed by the semiconductor system 1 according to the first embodiment. First, the TCPM 10 initializes and the State Machine starts (step S102). The state machine is then toggled between the "Apply Rp" and "Apply Rd" states.

Then, when the opposite device connects to the USB port, the state machine transitions to the "Potential_Connect_As_Snk" state or the "Potential_Connect_As_Src" state. At this time, the controller 110 of the TCPC 100 determines whether or not the connection confirmation state has continued for the first time (step S104). If the connection confirmation state does not continue for the first time (NO, in S104), the controller 110 controls the state machine to transition to the "Apply Rp" state or the "Apply Rd" state (step S105).

On the other hand, when connection confirmation state continues for the first time (YES, in S104), the controller 110 controls the state machine so that the state transitions to the connected state. As a result, the state machine transitions to the "Attached.Snk" state or the "Attached.Src" state. In step S106, the controller 110 transmits to the TCPM 10 a notification indicating that the connected state has changed to the connected state. When the connection detection unit 14 receives this notification, the TCPM 10 executes a process in the "Attached.Snk" state or the "Attached.Src" state (step S108).

Assume that when the state machine is in the "Attached. Snk" or "Attached. Src" state, the USB port is disconnected from the opposite device. In this case, the state machine transitions to the "Disconnected_As_Snk" or "Disconnected_As_Src" state. At this time, the TCPC 100 notifies the detection of VbusSinkDisconnected or a change in the status of the CC signal to the TCPM 10 (step S112). The TCPC 100 then switches off VBUS and discharges VBUS, step S114. The state machine then transitions to the "Apply Rd" state and then toggles between the "Apply Rp" and "Apply Rd" states.

Comparative Example

Figure 6:
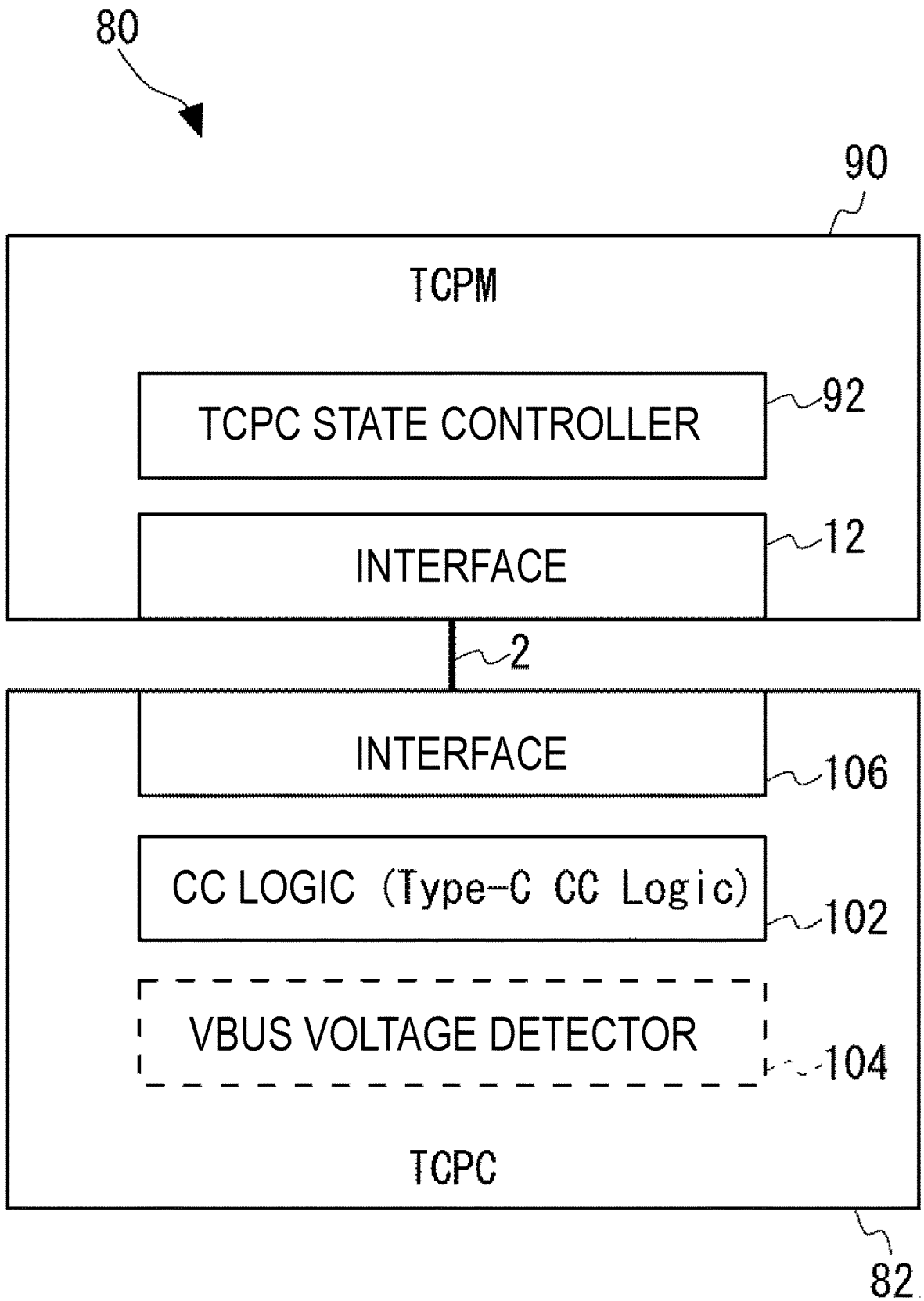
FIG. 6 is a diagram showing a configuration of a semiconductor system according to the comparative example.

The effects of present embodiment are explained below by comparing present embodiment with a comparative example. FIG. 6 is a diagram showing a configuration of a semiconductor system 80 according to the comparative example. Semiconductor system 80 includes a TCPM 90 (a port manager) and a TCPC 82 (a port controller). The TCPM 90 and the TCPC 82 are communicably connected via the I2C bus 2. The comparative examples correspond to system conforming to TCPCI specifications.

The TCPM 90 includes the interface 12 and a TCPC state controller 92. the TCPC 82 includes the CC logic 102, the VBUS detector 104, and the interface 106. The TCPC 82 according to the comparative embodiment differs from the TCPC 100 according to the first embodiment in that it does not have the controller 110. The TCPM 90 according to the comparative embodiment differs from the TCPM 10 according to the first embodiment in that it does not have the connection detection unit 14 but has the TCPC state controller 92. Other components are substantially the same as those associated with the first embodiment.

Figure 7:
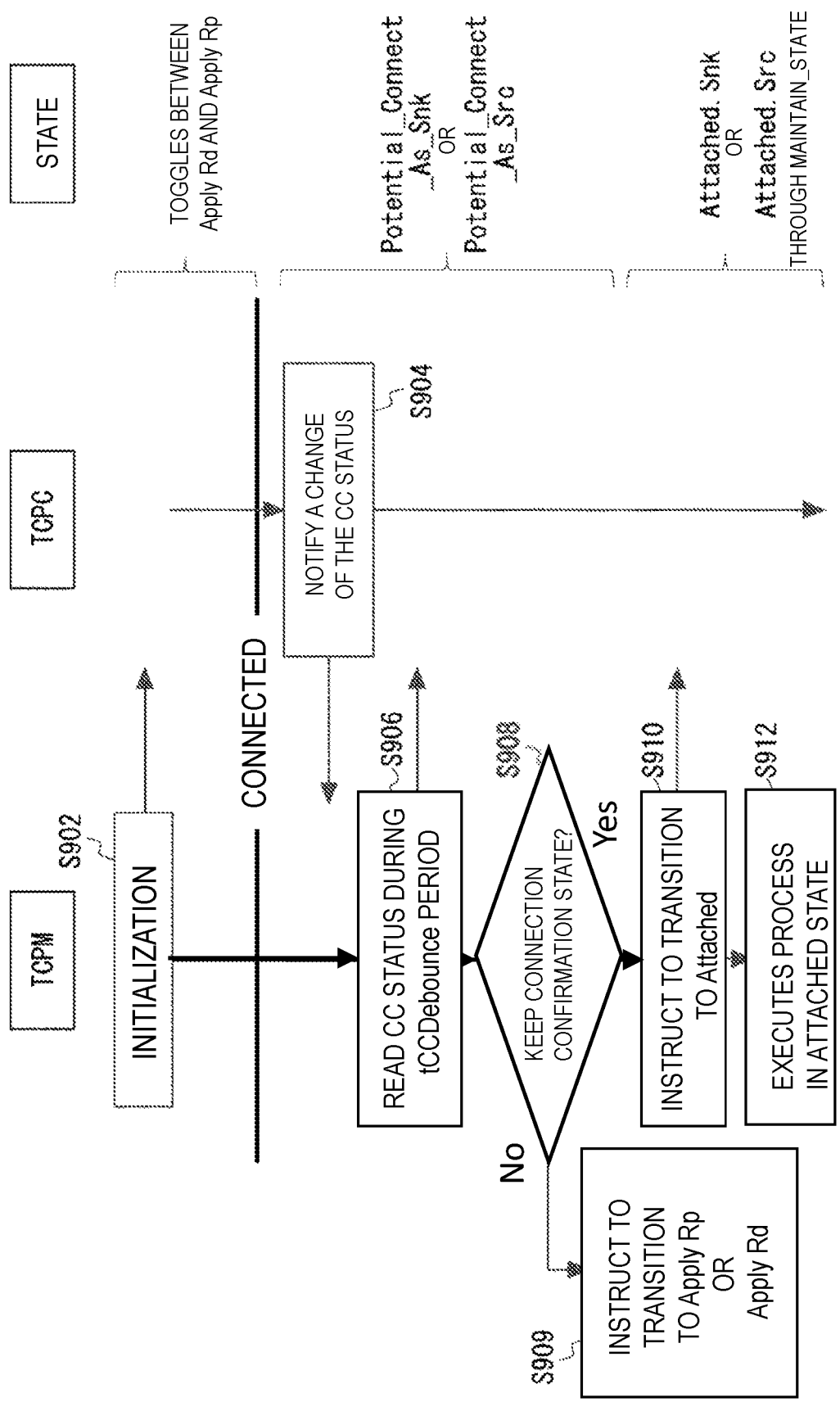
FIG. 7 is a sequence diagram showing a process performed by the semiconductor system according to the comparative example.
Figure 8:
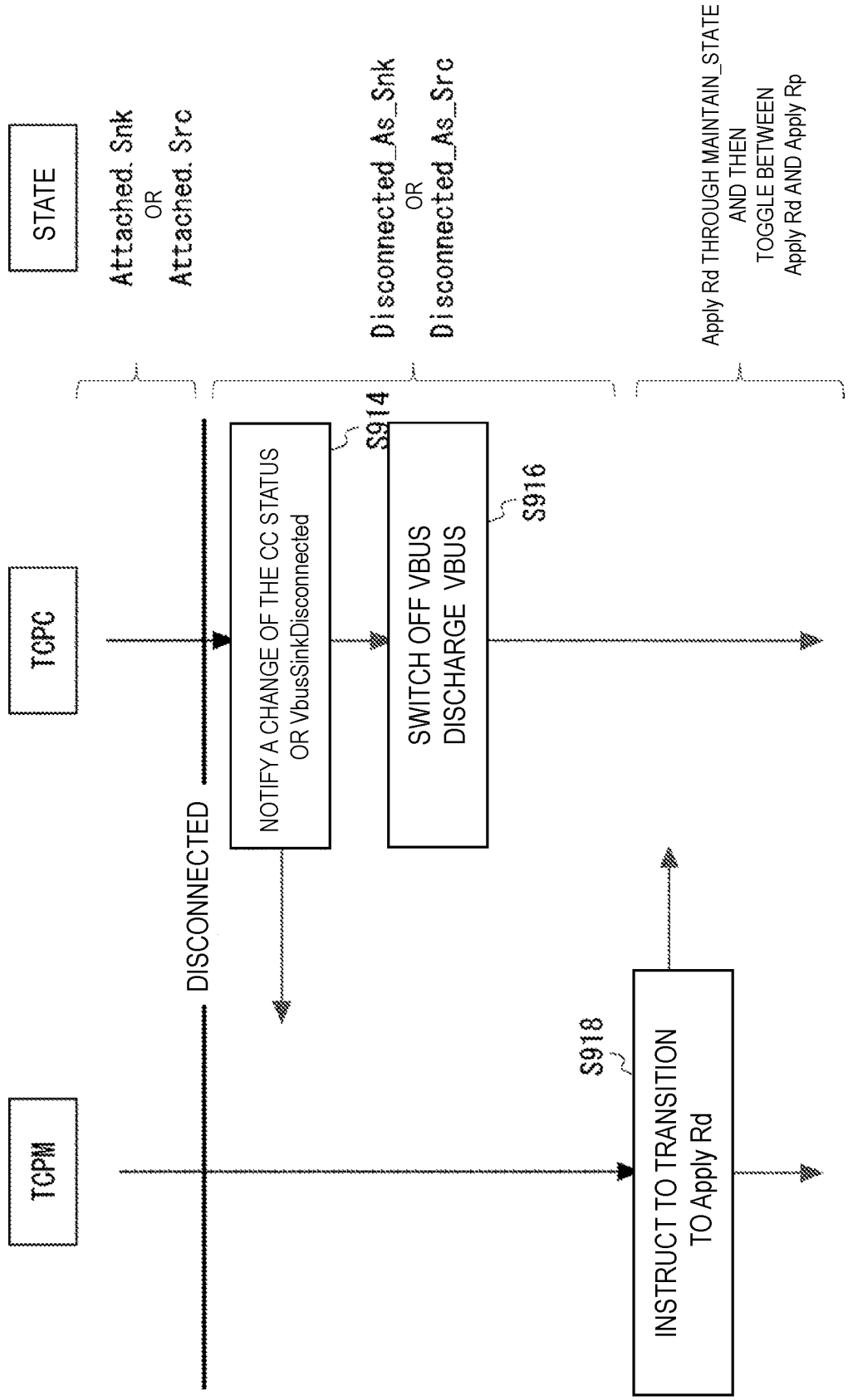
FIG. 8 is a sequence diagram showing a process performed by the semiconductor system according to the comparative example.

FIGS. 7 and 8 are sequence diagrams showing processing executed by the semiconductor system 80 according to the comparative example. First, the TCPM 90 zero times and the State Machine starts (step S902). The state machine is then toggled between the "Apply Rp" and "Apply Rd" states.

Then, when the opposite device connects to the USB port, the state machine transitions to the "Potential_Connect_As_Snk" state or the "Potential_Connect_As_Src" state. At this time, the TCPC 82 notifies the TCPM 90 of a change in the status (CC status) of the CC signals (step S904). At this time, the TCPC state controller 92 of the TCPM 90 reads the CC status for tCCDebounce period via the I2C bus 2 (step S906). Specifically, the TCPC state controller 92 accesses the CC status register of the TCPC 82 to read the CC status.

Then, the TCPC state controller 92 determines whether or not connection confirmation state has continued for tCCDebounce period in step S908. When the connection confirmation state does not continue for tCCDebounce period (NO, in S908), the TCPC state controller 92 transmits an instruction to the TCPC 82 to transition to the "Apply Rp" state or the "Apply Rd" state (step S909). The state machine then transitions through the "Maintain State" (FIG. 3) to the "Apply Rp" or "Apply Rd" state. On the other hand, when the connection confirming state continues for tCCDebounce time (Yes in S908), the TCPC state controller 92 transmits to the TCPC 82 an instruction to transition to the connected state (step S910). Specifically, the TCPC state controller 92 accesses the CC status register of the TCPC 82 to write the control content. This causes the state machine to transition to the "Attached. Snk" state or the "Attached. Src" state through the "MAINTAIN_STATE" (FIG. 3). The TCPM 90 performs operations in the "Attached. Snk" or "Attached. Src" state (step S912).

Assume that when the state machine is in the "Attached. Snk" or "Attached. Src" state, the USB port is disconnected from the opposite device. In this case, the state machine transitions to the "Disconnected_As_Snk" or "Disconnected_As_Src" state. At this time, the TCPC 82 notifies the detection of VbusSinkDisconnected or of a change of the status of the CC signal to the TCPM 90 (step S914). the TCPC 82 then switches off VBUS and discharges VBUS, step S916. The TCPM 90 (TCPC state controller 92) receives the notification and transmits an instruction that changes the state to "Apply Rd" to the TCPC 82 (step S918). This causes the state machine to transition to the "Apply Rd" state through the "Maintain State" (FIG. 3). The state machine then toggles between the "Apply Rp" and "Apply Rd" states.

As the comparative example described above, in TCPCI specification, the TCPM 90 (TCPC state controller 92) accesses the TCPC 82 registers through the I2C bus 2, thereby transiting the state machine to the connected state. At this time, by performing communication between the TCPC 82 and the TCPM 90 through the I2C bus 2, the communication time may increase. Therefore, since the communication time further increases as the number of ports increases, it is difficult to increase the number of ports in the system according to the comparative example. On the other hand, in AC adapters for Type-A connectors, there are many products with more than four ports. Therefore, it is desirable to increase the number of ports even in Type-C products.

On the other hand, present embodiment is configured as described above so that the TCPC 100 can change the state machine to the connected state in the process of connecting the USB port. In other words, present embodiment allows the state machine to transition to the connected state without the TCPM 10 intervention in the connection process on the USB port. This makes it possible to reduce the communication time through the I2C bus 2. Accordingly, present embodiment can reduce the amount of time it takes to process a connection to a USB port in connection processing to the USB port. As a result, even if the number of ports is increased, it is possible to suppress an increase in processing time.

The controller 110 of the first embodiment uses the timer 112 to measure the duration of the connection check status in which the USB port is connected to the USB port. Then, the controller 110 transitions the connected state to the connected state when the duration has elapsed a predetermined first period of time (tCCDebounce period). This allows the TCPC 100 to efficiently transition state machines to the connected state without the TCPM 10 intervention.

When the connection to the USB port is disconnected before the duration of the connection confirmation state passes for the first time, the controller 110 on the first embodiment transits the connection state to the disconnected state. This allows the state machine to go to the disconnected state without the TCPM intervention. Therefore, even when the state machine is shifted to the disconnected state, the communication time through the I2C bus 2 can be reduced.

(Example of Other State Machine According to the Present Embodiment)

FIGS. 9 to 12 are diagrams showing another example of the state transition diagram realized in the semiconductor system 1 according to the first embodiment. In the state transition diagrams illustrated in FIGS. 9 to 12, descriptions of states and transitions unrelated to present embodiment will be omitted as appropriate.

Figure 9:
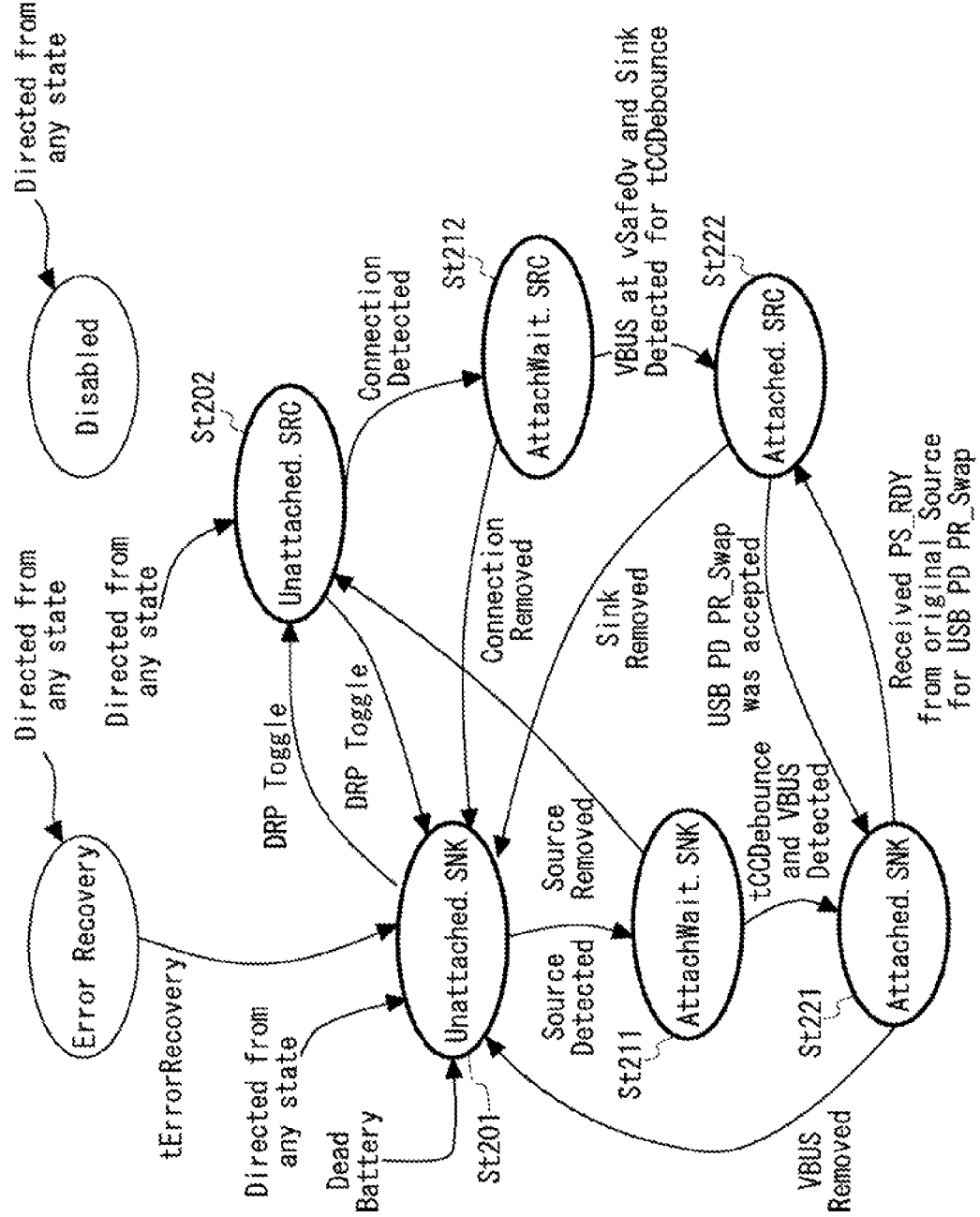
FIG. 9 is a diagram showing another example of a state-transition diagram realized in the semiconductor system according to the first embodiment.

FIG. 9 illustrates a state-transition diagram for DRP devices that conform to Type-C specifications. The state machine (connected state) alternately transitions between the "Unattached.SNK" state St201 and the "Unattached.SRC" state St202 at regular intervals. That is, the state machine toggles states between the "Unattached.SNK" state St201 and the "Unattached.SRC" state St202 at regular intervals. The "Unattached. SNK" state and the "Unattached. SRC" state correspond to the "disconnected state" described above. The "Unattached.SNK" state St201 is a state in which the CC signal of the CC signal itself is controlled to be connected to the Rd signal. In the "Unattached.SRC" state St202, its own CC signal is controlled to be connected to the Rp signal.

Assume that when the state machine is in the "Unattached.SNK" state St201, an opposite device having a source function is connected to the USB port, and the potential of the CC signal is divided as described above. In this instance, as described above, the state machine transitions to the "AttachWait.SNK" state St211. The "AttachWait.SNK" state corresponds to the "connection confirmation state" described above. At this time, as described above, the controller 110 measures the time from the transition to the "AttachWait.SNK" state St211 by using the timer 112. In this state, when the opposite device having the source function is detached from the USB port, the state machine transitions to the "Unattached.SRC" state St202 under the control of the controller 110. On the other hand, the state in which the potential in the CC signal is divided is continued for a first time (tCCDebounce), the voltage of VBUS line is detected. In this instance, under the control of the controller 110, the state machine transitions to the "Attached.SNK" state St221. The "Attached.SNK" state corresponds to the "connected state" described above. Further, in this state, when the voltages of VBUS lines are not detected and the disconnection from the opposite device having the source function is detected, the state machine transitions to the "Unattached.SNK" state St201.

On the other hand, it is assumed that when the state machine is in the "Unattached.SRC" state St202, the opposite device having the sinking function is connected to the USB port, and the potential of the CC signal is divided as described above. In this instance, as described above, the state machine transitions to the "AttachWait.SRC" state St212. The "AttachWait.SRC" state corresponds to the "connection confirmation state" described above. At this time, as described above, the controller 110 measures the time from the transition to the "AttachWait.SNK" state St211 by using the timer 112. In this state, when the opposite device having the sync function is removed from the USB port, the state machine transitions to the "Unattached.SNK" state St201 under the control of the controller 110. On the other hand, the state in which the potential in the CC signal is divided is continued for a first time (tCCDebounce), the voltage of VBUS line is assumed to have been vSafe0V. In this instance, under the control of the controller 110, the state machine transitions to the "Attached.SRC" state St222. The "Attached.SRC" state corresponds to the "connected state" described above. In this state, when the release of the connection with the opposite device having the sync function is detected, the state machine transitions to the "Unattached.SNK" state St201.

Figure 10:
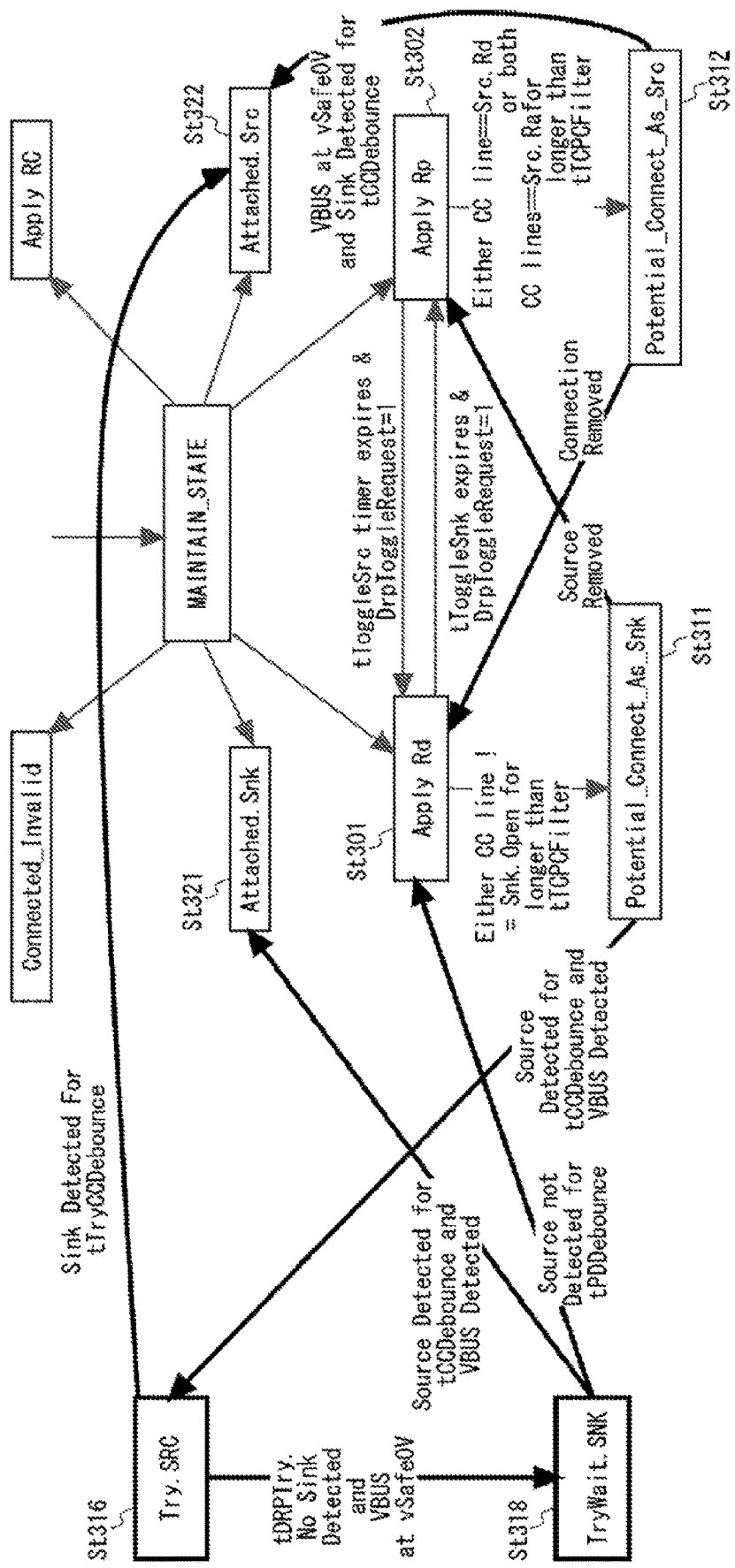
FIG. 10 is a diagram showing another example of a state-transition diagram realized in the semiconductor system according to the first embodiment.
Figure 11:
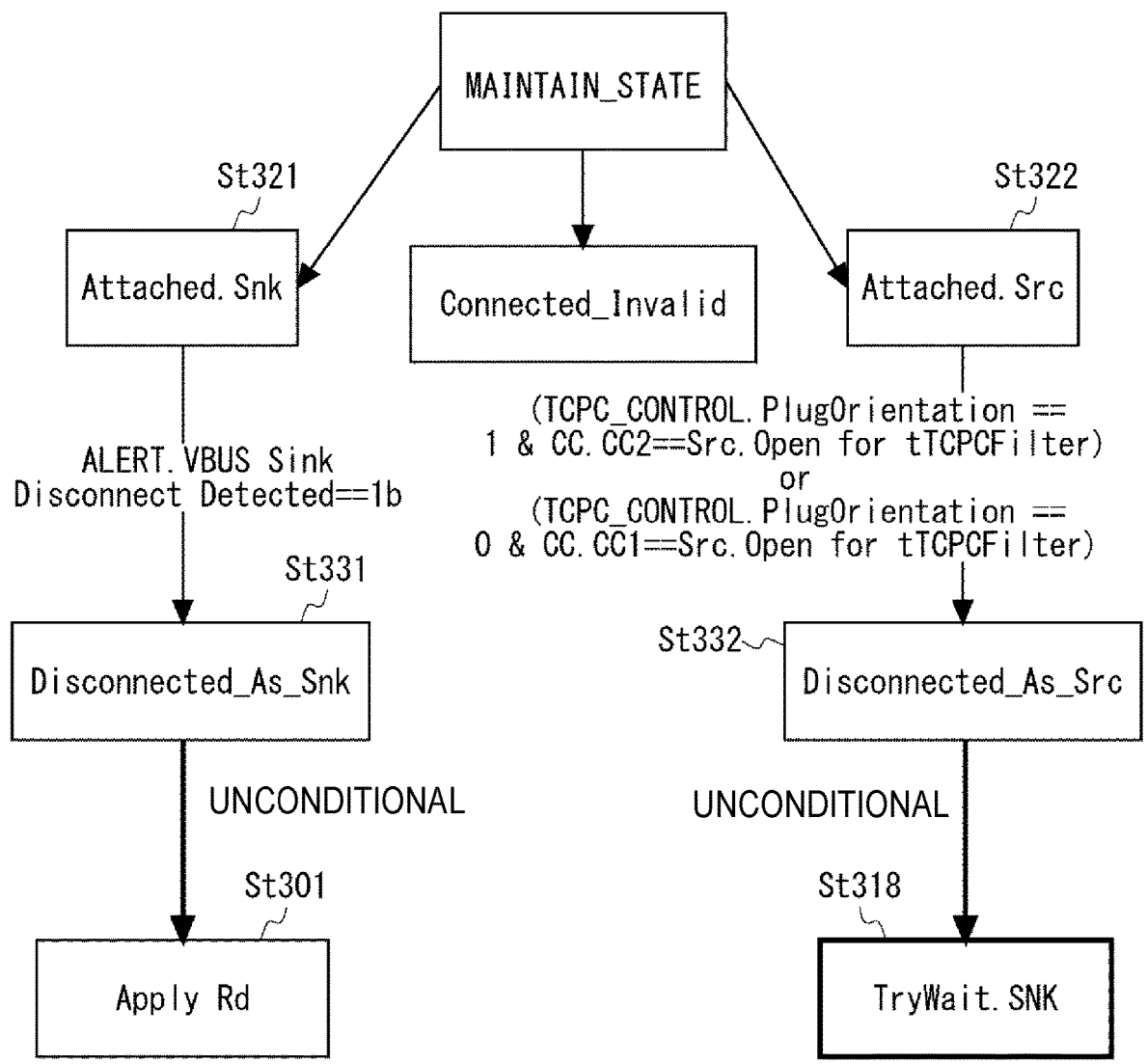
FIG. 11 is a diagram showing another example of a state-transition diagram realized in the semiconductor system according to the first embodiment.

FIGS. 10 and 11 illustrate state-transition diagrams for Try.SRC devices corresponding to TCPCI specifications. FIG. 10 shows a state transition diagram until the connection state transitions to the connected state. Here, the Try.SRC device is a DRP device that acts as a source when connecting to other DRP devices. Although an example of the Try.SRC device is shown in FIGS. 10 and 11, the same applies to the Try.SNK device. Here, the Try.SNK device is a DRP device that acts as a sink when connecting to other DRP devices.

Note that the "Apply Rd" state St301 and the "Apply Rp" state St302 shown in FIG. 10 are substantially the same as St101 and St102 shown in FIG. 2, respectively. The "Potential_Connect_As_Snk" state St311 shown in FIG. 10 is substantially the same as St111 shown in FIG. 2. Also, the "Potential_Connect_As_Src" state St312 shown in FIG. 10 is substantially the same as St112 shown in FIG. 2. The "Attached.Snk" state St321 shown in FIG. 10 is substantially the same as St121 shown in FIG. 2. The "Attached.Src" state St322 shown in FIG. 10 is substantially the same as St122 shown in FIG. 2.

Also, the transition between St301 and St302 shown in FIG. 10 is substantially similar to the transition between St101 and St102 shown in FIG. 2. The transition from St301 to St311 shown in FIG. 10 is substantially the same as the transition from St101 to St111 shown in FIG. 2. The transition from St302 to St312 shown in FIG. 10 is substantially the same as the transition from St102 to St112 shown in FIG. 2.

The transition from St311 to St302 shown in FIG. 10 is substantially the same as the transition from St111 to St102 shown in FIG. 2. The transition from St312 to St301 shown in FIG. 10 is substantially the same as the transition from St112 to St101 shown in FIG. 2. The transition from St312 to St322 shown in FIG. 10 is substantially the same as the transition from St112 to St122 shown in FIG. 2.

Assume that when the state machine is in the "Potential_Connect_As_Snk" state St311, the state in which the potential in the CC signal is divided continues for tCCDebounce period, and the voltage of VBUS line is detected. At this time, under the control of the controller 110, the state machine transitions to the "Try.SRC" state St316. In this St316, the TCPC 100 will check if the opposite device connected to the USB port has a sink function. In addition, at this St316, the device connects a resistor Rp to the CC signals, and the state machine confirms whether the opposing device makes an Rd connection or not. That is, the controller 110, when it is St311, a state in which the potential in the CC signal is divided is continued for a tCCDebounce period, determines whether the voltage of VBUS line is detected. Then, the state in which the potential in the CC signal is divided continues for a tCCDebounce period, when the voltage of VBUS line is detected, the controller 110 transits the connection state to the opposite device confirmation state (St316).

When the state machine is in the "Try.SRC" state St316, the CC signals of the opposite device are Rd-connected during tTryCCDebounce period to divide the potential, and the sink is detected. At this time, under the control of the controller 110, the state machine transitions to the "Attached.Src" state St322. That is, the controller 110, when it is St316, when the opposite device detects that it has a power receiving function (specific function; first function) is tTryCCDebounce period (second time) continues, to transit the connection state to the connected state.

On the other hand, when the state machine is in the "Try.SRC" state St316, it is assumed that no sink is detected after tDRPTry period has elapsed and the voltage of VBUS line is vSafe0V. At this time, under the control of the controller 110, the state machine transitions to the "TryWait.SNK" state St318. In this St318, the state machine waits for the USB port to be connected as sinks. That is, the controller 110, when it is St316, when the opposite device side after tDRPTry time (third time) elapses is not detected that has a power receiving function, the connection state to transit to "TryWait. SNK". In other words, the controller 110, when it is St316, after the lapse of the third time, when the opposite device side does not detect that it has a specific function, transits the connection state to the "specific function standby state". "specific function state state" is a state in which the USB port is waiting for a specific function.

In this St318, the device connects the CC signal to the resistor Rd, and the state machine determines whether or not the counterpart device makes the Rp connection. In this St318, in tCCDebounce period, suppose that the source is detected by divided potential is continuously detect by the CC signal of the opposite device is connected as Rp connection, and then the voltage of VBUS line is detected. At this time, under the control of the controller 110, the state machine transitions to the "Attached.Snk" state St321. On the other hand, in St318, when no source is detected during tPDDebounce period, the state machine transitions to the "Apply Rd" state St301 under the control of the controller 110. In other words, the controller 110, when it is St318, when the state of detecting that the opposite device side has a power supply function continues for a tCCDebounce period, transits the connection state to the "connected state". On the other hand, the controller 110, when it is St318, when the state in which the opposite device side is not detecting that it has a power supply function continues for a tPDDebounce period (fourth time), transits the connection state to the "disconnected state".

FIG. 11 shows a state transition diagram from a connected state to a disconnected state. The "Disconnected_As_Snk" state St331 shown in FIG. 11 is substantially the same as St131 shown in FIG. 3. The "Disconnected_As_Src" state St332 shown in FIG. 11 is substantially the same as St132 shown in FIG. 3.

The transition from St321 to St331 shown in FIG. 11 is substantially the same as the transition from St121 to St131 shown in FIG. 2. The transition from St322 to St332 shown in FIG. 11 is substantially the same as the transition from St122 to St132 shown in FIG. 2. The transition from St331 to St301 shown in FIG. 11 is substantially the same as the transition from St131 to St101 shown in FIG. 2. When the state machine transitions to the "Disconnected_As_Src" state St332, it unconditionally transitions to the "TryWait. SNK" state St318.

Figure 12:
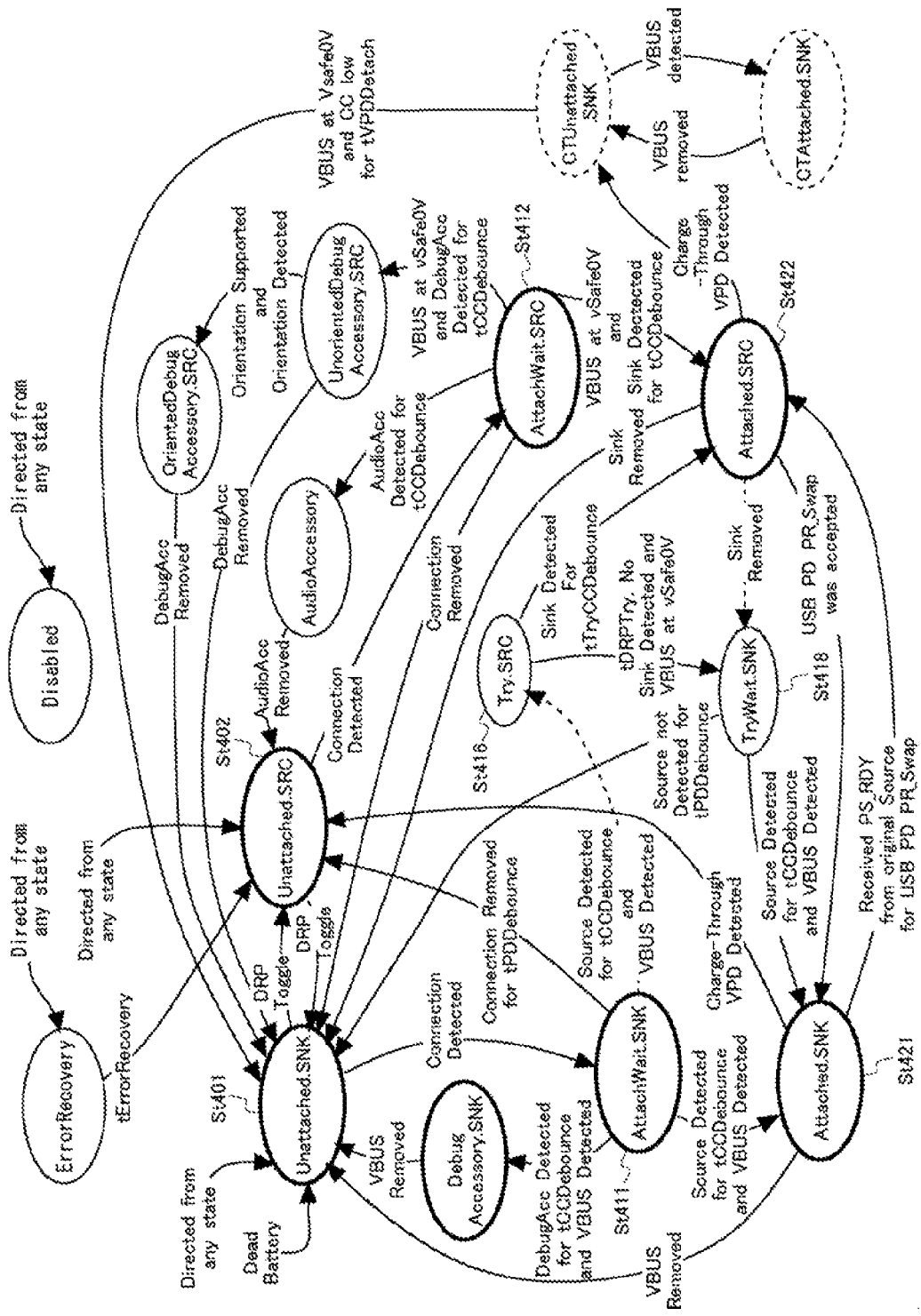
FIG. 12 is a diagram showing another example of a state-transition diagram realized in the semiconductor system according to the first embodiment.

FIG. 12 illustrates a state transition diagram for Try.SRC device corresponding to Type-C specifications. Note that the "Unattached.SNK" state St401 and the "Unattached.SRC" state St402 shown in FIG. 12 are substantially the same as St201 and St202 shown in FIG. 9, respectively. The "AttachWait.SNK" state St411 shown in FIG. 12 is substantially the same as St211 shown in FIG. 9. The "AttachWait.SRC" state St412 shown in FIG. 12 is substantially the same as St212 shown in FIG. 9. The "Attached.SNK" state St421 shown in FIG. 12 is substantially the same as St221 shown in FIG. 9. The "Attached.SRC" state St422 shown in FIG. 12 is substantially the same as St222 shown in FIG. 9.

The transition between St401 and St402 shown in FIG. 12 is substantially the same as the transition between St2101 and St202 shown in FIG. 9. The transition from St401 to St411 shown in FIG. 12 is substantially the same as the transition from St201 to St211 shown in FIG. 9. The transition from St402 to St412 shown in FIG. 12 is substantially the same as the transition from St202 to St212 shown in FIG. 9.

The transition from St411 to St402 shown in FIG. 12 is substantially the same as the transition from St211 to St202 shown in FIG. 9. The transition from St412 to St401 shown in FIG. 12 is substantially the same as the transition from St212 to St201 shown in FIG. 9. The transition from St412 to St422 shown in FIG. 12 is substantially the same as the transition from St212 to St222 shown in FIG. 9. The transition from St421 to St401 shown in FIG. 12 is substantially the same as the transition from St221 to St201 shown in FIG. 9.

Suppose that when the state machine is in the "Attach-Wait. SNK" state St411, the potential in the CC signal continues for a tCCDebounce period and the voltage in VBUS line is detected. At this time, under the control of the controller 110, the state machine transitions to the "Try.SRC" state St416. In this St416, the TCPC 100 will check if the opposite device connected to the USB port has a sink function.

When the state machine is in the "Try.SRC" state St416, the CC signals of the opposite device is Rd connection during tTryCCDebounce period to divide the potential, and the sink is detected. At this time, under the control of the controller 110, the state machine transitions to the "Attached.SRC" state St422.

On the other hand, when the state machine is in the "Try.SRC" state St416, no sinks are detected in tDRPTry periods, and the voltages of VBUS lines are vSafe0V. At this time, under the control of the controller 110, the state machine transitions to the "TryWait.SNK" state St418. In this St418, the state machine waits for the USB port to be connected as sinks.

In this St418, in tCCDebounce period, the CC signal of the opposite device is Rp-connected state potential is divided is continuously detected source, the voltage of VBUS line is detected. At this time, under the control of the controller 110, the state machine transitions to the "Attached.SNK" state St421. On the other hand, in St418, when no source is detected during tPDDebounce period, the state machine transitions to the "Unattached.SNK" state St401 under the control of the controller 110.

Thus, by providing a controller 110 in the TCPC 100, state transitions in any state machine can be performed by the TCPC 100 without the TCPM 10 intervention. This makes it possible to reduce the communication time through the I2C bus 2. Accordingly, present embodiment can reduce the processing time for connection processing to the USB port for the semiconductor system 1 with respect to any state machine during connection processing to the USB port. As a result, even if the number of ports is increased, it is possible to suppress the processing time from being applied to the image.

In the case of a Try.SNK device, the above-described specific function (first function) may be a power supply function. Then, the controller 110 performs processing for the "Try.SNK" state instead of the processing for the "Try.SRC" state described above. Similarly, the controller 110 performs processing for the "TryWait. SRC" state instead of the processing for the "TryWait. SNK" state described above.

Second Embodiment

Next, the second embodiment will be described. Semiconductor system in the second embodiment differ from semiconductor system in the first embodiment in that the TCPC 100 controls the power supply circuitry. The rest of the configuration is substantially the same as the configuration according to the first embodiment.

Figure 13:
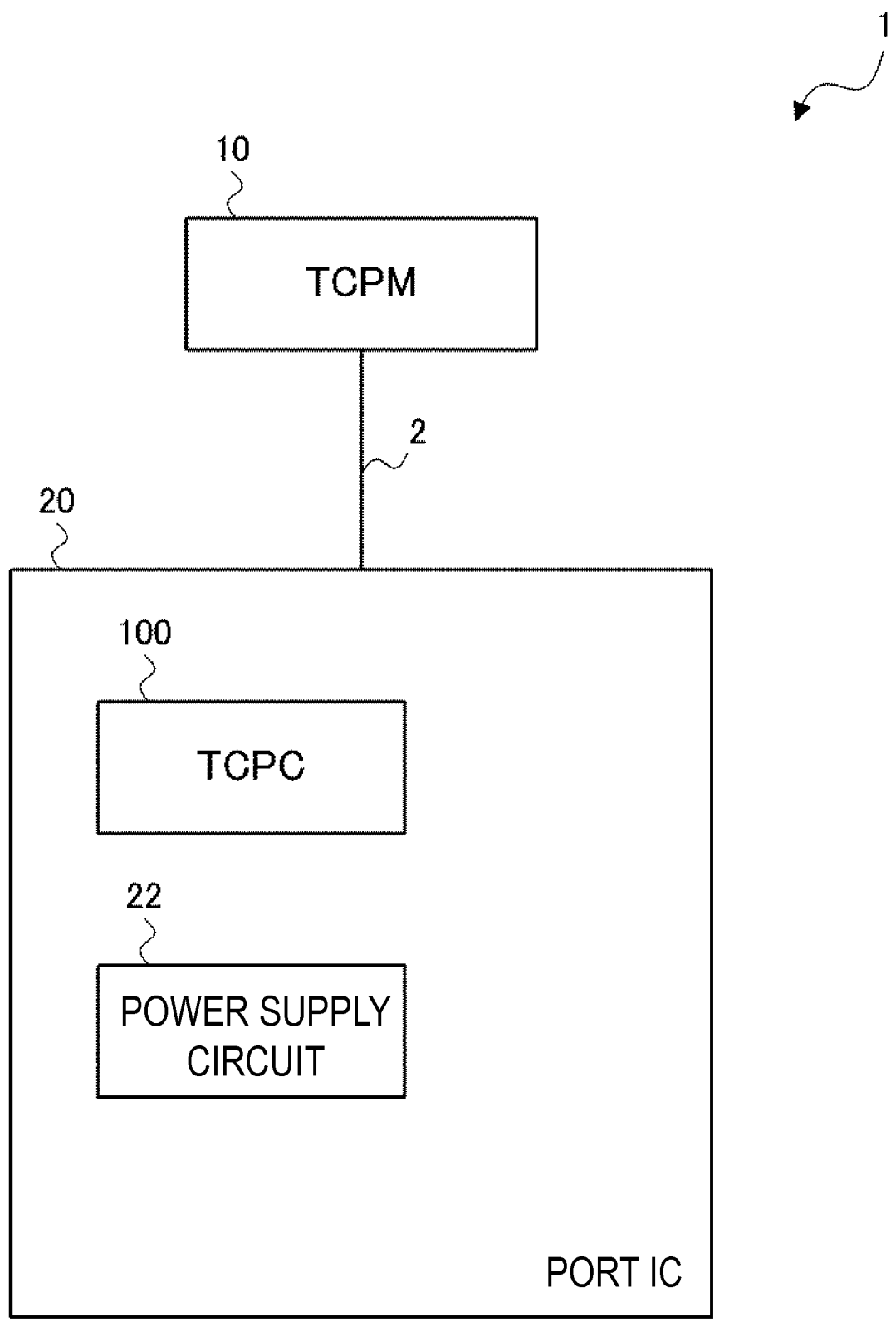
FIG. 13 is a diagram showing a configuration of a semiconductor system according to a second embodiment.

FIG. 13 is a diagram showing a configuration of the semiconductor system 1 according to the second embodiment. The semiconductor system 1 according to the second embodiment includes the TCPM 10 and a port IC 20. The TCPM 10 and the port IC 20 are communicably connected via the I2C bus 2. The configuration of the TCPM 10 for the second embodiment is essentially the same as the configuration of the TCPM 10 for the first embodiment. A port IC 20 is provided for each USB port. The port IC 20 handles the corresponding USB port.

The port IC 20 include the TCPC 100 and power supply circuit 22. The configuration of the TCPC 100 according to the second embodiment is substantially the same as the configuration of the TCPC 100 according to the first embodiment. Power supply circuit 22 performs at least one of the power receiving and power supply. The controller 110 of the TCPC 100 controls the power supply circuit 22 when the connected state transitions to the connected state. In present embodiment, the controller 110 transitions the connected state to the connected state, so that the controller 110 can directly control the power supply circuit 22 instead of the TCPM 10 circuit.

Specifically, when the connection state transitions to the "Attached. SNK" state, the controller 110, so that the power receiving process to the power supply circuit 22, controls the power supply circuit 22. In this case, the control of the controller 110, the power supply circuit 22 turns on the switch of VBUS power receiving circuit, to enable VBUS power receiving circuit. Thus, the device on which the semiconductor system 1 is mounted, power is supplied from the opposite device.

Further, when the connection state transitions to the "Attached. SRC" state, the controller 110, so as to power the power supply circuit 22, controls the power supply circuit 22. In this case, the control of the controller 110, the power supply circuit 22 outputs VBUS to the opposite device. Furthermore, when VCONN is supported, the power supply circuitry 22 outputs VCONN to the cables.

In FIG. 13, an example in which the power supply circuit 22 is incorporated in the port IC 20 is shown, present embodiment is not limited to such a configuration. The power supply circuit 22 may not be built in the port IC 20, but may be external to the port IC 20. In this instance, the power supply circuit 22 may be connected to the port IC 20 (TCPC 100) via a gate control signal line or the like. controller 110, when the connection state transitions to the connected state, via a bus, transmits a control signal to the power supply circuit 22. Power supply circuit 22 receives a control signal, performs power receiving treatment or power supply processing according to the control signal.

Similar to the semiconductor system 1 according to the first embodiment, the semiconductor system 1 according to the second embodiment is capable of transitioning the state machine to the connected state without involving the TCPM 10 in the connecting process in the USB port. This makes it possible to reduce the communication time through the I2C bus 2. Therefore, the semiconductor system 1 of the second embodiment can have substantially the same effects as those on the first embodiment.

Further, the semiconductor system 1 according to the second embodiment, as described above, the controller 110 provided on the TCPC 100 controls the power supply circuit 22. In other words, in the semiconductor system 1 according to the second embodiment, the TCPC 100 can directly control the power supply circuit 22 without involvement of the TCPM 10. Therefore, as compared to when the TCPM 10 controls the power supply circuit 22, efficiently, it is possible to control the power supply circuit 22. In other words, as compared to when the TCPM 10 controls the power supply circuitry 22, efficiently, it is possible to perform the power receiving process or power supply process.

Third Embodiment

Next, the third embodiment will be described. The third embodiment differs from the other embodiments in that it is considered that Type-C specification or TCPCI specification (hereinafter referred to as the "Type-C specification, etc.") is updated. In other words, Type-C specifications and the like may be updated after the semiconductor system 1 according to present embodiment is mounted on the semiconductor system 1. In this case, state addition, change of transition conditions, and the like in the state machine may be performed. The semiconductor system 1 according to the third embodiment is configured to be able to cope with such a case.

Figure 14:
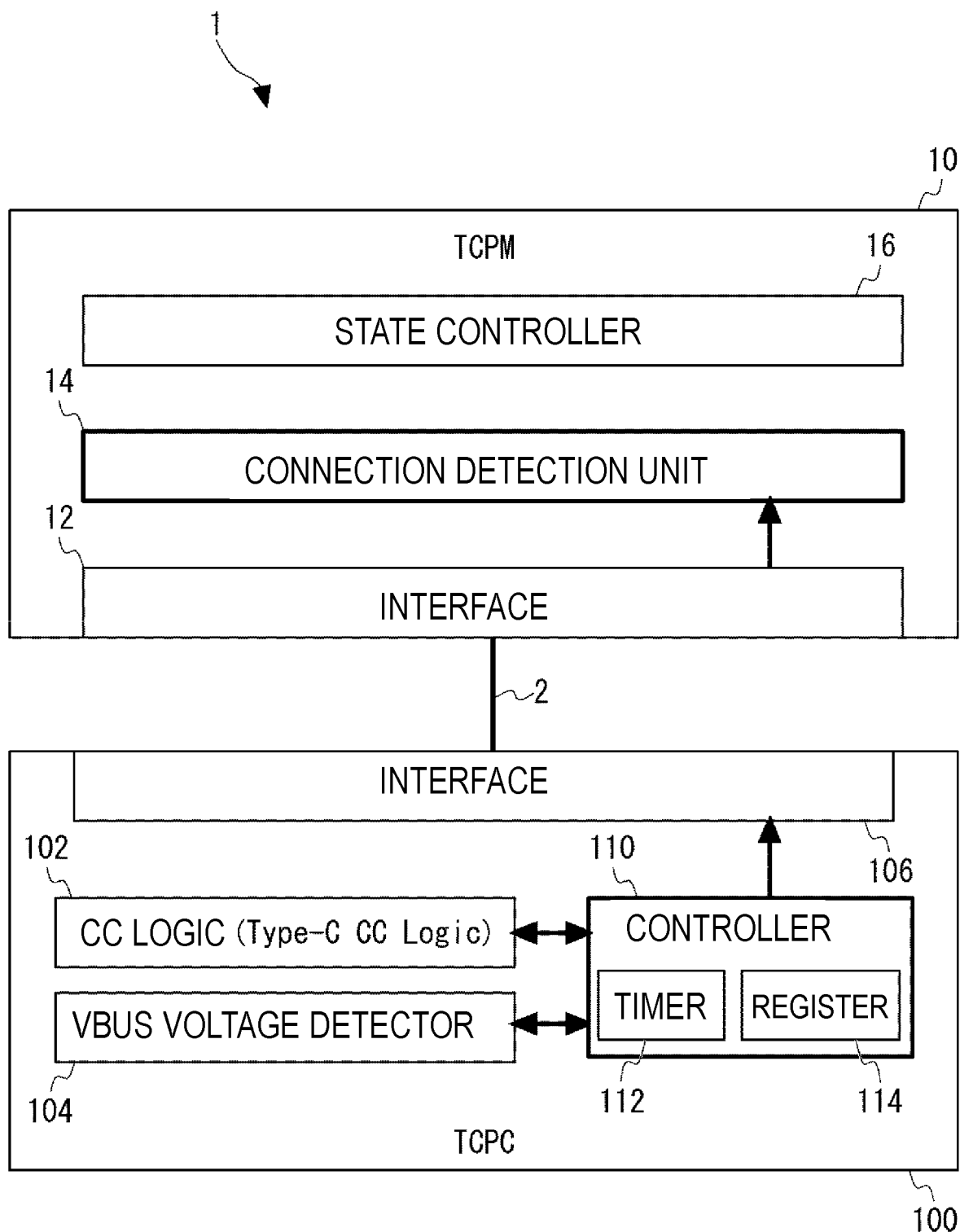
FIG. 14 is a diagram showing a configuration of a semiconductor system according to a third embodiment.

FIG. 14 is a diagram showing a configuration of the semiconductor system 1 according to the third embodiment. Similar to the semiconductor system 1 related to the first embodiment, the semiconductor system 1 related to third embodiment has the TCPM 10 and the TCPC 100. The TCPM 10 includes interface 12, the connection detection unit 14, and a state controller 16. The TCPM 10 required for the third embodiment differs from TCPM 10 of the other embodiments in that it has the state controller 16. Other configurations of the TCPM 10 according to the third embodiment are substantially the same as those of the TCPM 10 according to the other embodiments. The state controller 16 performs substantially the same process as the TCPC state controller 92 when receiving a notification from the TCPC 100. Details will be described later.

The TCPC 100 has the CC logic 102, the VBUS voltage detector 104, the interface 106, and the controller 110. The controller 110 includes the timer 112 and the register 114. The TCPC 100 required for the third embodiment differs from the TCPC 100 of other embodiments in that the controller 110 has the register 114. Other configurations of the TCPC 100 according to the third embodiment are substantially the same as those of the TCPC 100 according to the other embodiments. The register 114 sets a predetermined state (first state) in the state machine. The first state (set state) set in the register 114 corresponds to the state about the state or transition condition changed in the state machine when Type-C specifications, etc. are updated. Details will be described later.

Figure 15:
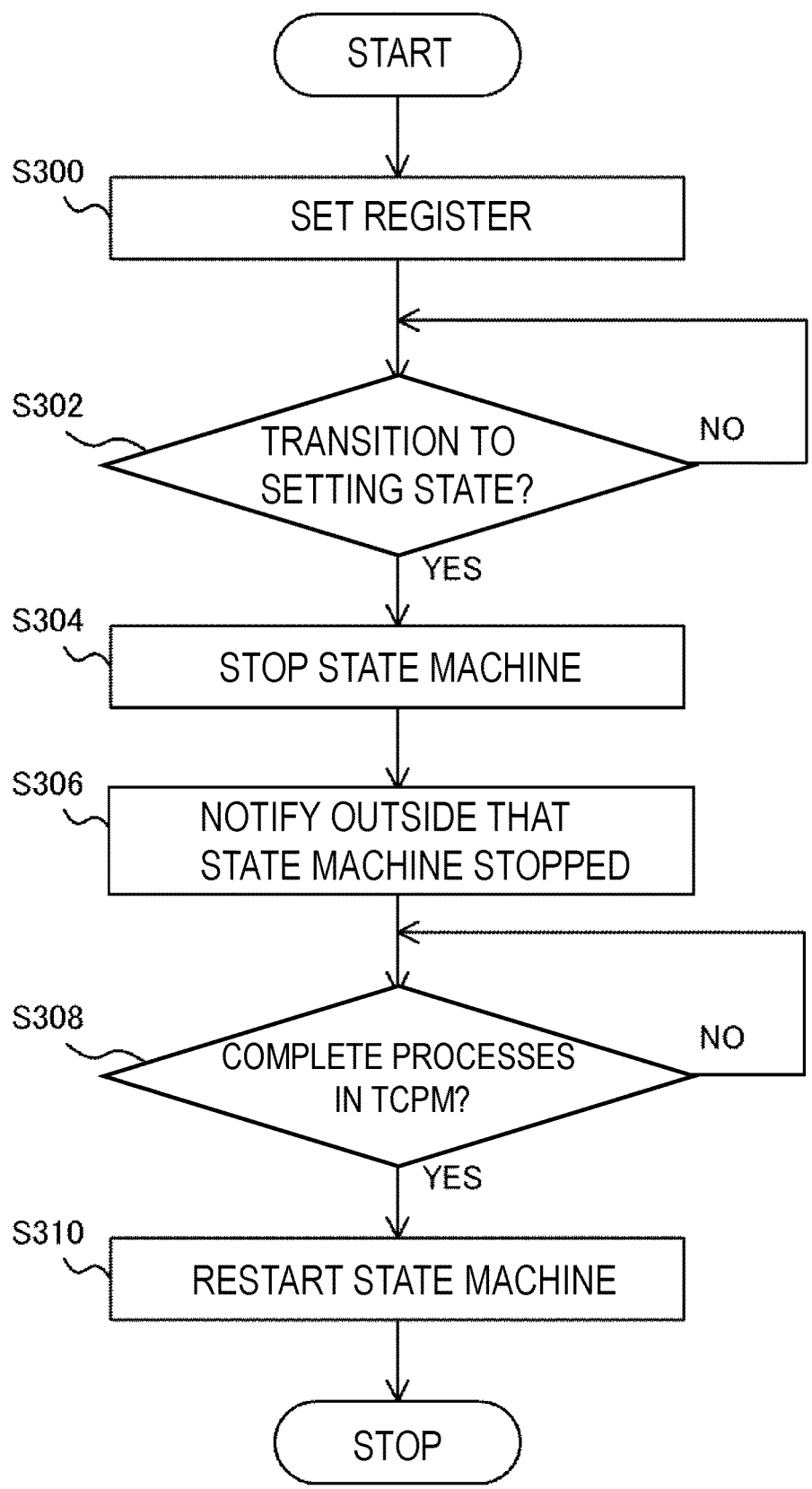
FIG. 15 is a flowchart showing a control method executed by the control unit according to the third embodiment.

FIG. 15 is a flow chart showing control methods executed by the controller 110 according to the third embodiment. The controller 110 sets a predetermined state in the register 114 (Step S300). Here, if a state is added in a state machine, the setting state can be the state from which the added state transitions. Further, in the state machine, when a transition condition from one state to another state is changed, the setting state may be a state which is a transition source of the changed transition condition.

The controller 110 determines whether or not the connected state (state machine) has transitioned to the set state (step S302). When the state shifts to the setting state (YES, in S302), the controller 110 stops the state machine (Step S304). That is, the controller 110 has a function of stopping the state machine when the connection state transitions to the first state.

In step S306, the controller 110 transmits a notification indicating that the state machine has been stopped to the outside. That is, the controller 110 has a function of notifying the outside that the state machine has been stopped. When the TCPM 10 receives this notification via I2C-bus 2, the process in TCPM 10 begins. Specifically, the state controller 16 controls the state or the transition condition changed in the updated Type-C specifications or the like.

In step S308, the controller 110 determines whether or not the process in the above-described the TCPM 10 has been completed. When the process in the TCPM 10 is completed (Yes, in S308), the controller 110 restarts the state machine from the state controlled by the state controller 16 or the state of the transition destination of the transition condition (Step S310). As a result, the controller 110 can perform control relating to the state or the transition condition that has not been changed in the same manner as in the above-described embodiment.

Specific examples will be described. For example, it is assumed that a state is newly added between the "Try.SRC" state St316 and the "TryWait.SNK" state St318 in the state transition diagram (state machine) shown in FIG. 10. In this instance, the controller 110 sets the "Try.SRC" state St316 in the register 114 as the setting state (S300). When the connected state transitions to the "Try.SRC" state St316 (S302 yes), the controller 110 stops the state machine (S304). In this instance, when the TCPM 10 receives the notification transmitted from the controller 110 in S306, the state controller 16 performs control relating to the newly added state. When the process in the TCPM 10 is completed (Yes, in S308), the controller 110 restarts the state machine from the state to which the added state is transferred (S310). That is, the controller 110 restarts the state machine from the "TryWait.SNK" state St318.

Further, for example, in the state transition diagram (state machine) shown in FIG. 10, it is assumed that a transition condition for transitioning from the "TryWait.SNK" state St318 to the "Apply Rd" state St301 is changed. In this instance, the controller 110 sets the "TryWait.SNK" state St318 in the register 114 as the setting state (S300). When the connected state transitions to the "TryWait.SNK" state St318 (YES in S302), the controller 110 stops the state machine (S304). In this instance, when the TCPM 10 receives the notification transmitted from the controller 110 in S306, the state controller 16 performs a process of determining the changed transitional condition. When the processing in the TCPM 10 is completed (YES, in S308), the controller 110 restarts the state machine from the state to which the transition condition was changed (S310). That is, the controller 110 restarts the state machine from the "Apply Rd" state St301.

Similar to the semiconductor system 1 according to the first embodiment, the semiconductor system 1 according to the third embodiment is capable of transitioning the state machine to the connected state without involving the TCPM 10 in the connecting process in the USB port. This makes it possible to reduce the communication time through the I2C bus 2. Therefore, the semiconductor system 1 of the third embodiment can have substantially the same effects as those on the first embodiment.

As described above, in the third embodiment, when the connected state transitions to the set state (first state), the controller 110 stops the state machine and transmits a notification that the state machine has been stopped to the outside. As a result, when Type-C specifications are updated, the TCPM 10 can control the changed state or transition condition. Thus, even if Type-C specifications are updated, it is unnecessary to reimplement the controller 110 of the hardware mounted on the TCPC 100.

As described above, in the third embodiment, when the process in the TCPM 10 is completed, the controller 110 restarts the state machine from the state (connected state) controlled by the state controller 16 or the state of the transition destination of the transition condition. As a result, the TCPC 100 can continue to process the state or transition condition that has not been changed. Therefore, even when Type-C specifications and the like are updated, the semiconductor system 1 according to the third embodiment can exhibit the effects of the semiconductor system 1 according to first embodiment.

As described above, the controller 110 according to the third embodiment includes the register 114 for setting the setting state. As a result, when Type-C specifications are updated, the original state of the changed part can be arbitrarily set. Therefore, the semiconductor system 1 according to present embodiment can be flexibly applied to any updates such as Type-C specifications.

Modified Example

Examples of state machines implemented in the TCPC 100 according to present embodiment, for example, are shown in FIGS. 2, 3, and 9 to 12. However, the state machine realized by the TCPC 100 according to present embodiment is not limited to the state machine illustrated in FIG. 2, FIG. 3, and FIG. 9 to FIG. 12.

Although the invention made by the inventor has been specifically described based on the embodiment, the present invention is not limited to the embodiment already described, and it is needless to say that various modifications can be made without departing from the gist thereof.

What is claimed is:

1. A semiconductor system comprising:
a port controller configured to control a USB (Universal Serial Bus) port; and
a port manager connected to the port controller via a bus, the port manager being configured to control the port controller,
wherein the port controller comprises:
a state machine configured to realize transition of a connection state in the USB port, wherein the connection state in the USB port transitions among 1) a connection confirmation state in which it is confirmed whether or not the opposite device connected to the USB port is electrically connected, 2) a connected state in which the opposite device connected to the USB port is confirmed to be electrically stably connected, and 3) a disconnected state in which the opposite device is confirmed to be disconnected from the USB port; and
a controller configured to:
when an opposite device connects to the USB port, control the state machine to transition the connection confirmation state in the USB port to the connection confirmation state,
determine whether the connection confirmation state in the USB port has continued for a first predetermined time period; and
when the controller of the port controller determines that the connection confirmation state has continued for the first predetermined time period, (i) control the state machine to transition the connection state in the USB port to the connected state from the connection confirmation state without receiving, from the port manager, instructions to change the connection state in the USB port to the connected state such that the port controller and (ii) output to the port manager a connected state transition notification that notifies the port manager that the connection state of the USB port transitioned to the connected state,
wherein the port manager comprises a connection detection unit configured to receive the connected state transition notification and detect a connection of the USB port based on the connected state transition notification received from the port controller, and
wherein the port manager performs a process according to the connection of the USB port detected by the connection detection unit.

2. The semiconductor system according to claim 1, wherein the bus is I2C (Inter-Integrated Circuit) bus.

3. The semiconductor system according to claim 1, wherein the controller further comprises a timer, and wherein the controller measures, using the timer, the first predetermined time period being a duration of the connection confirmation state.

4. The semiconductor system according to claim 3, wherein, when the connection to the USB port is released before the duration of the connection confirmation state elapses the first time, the controller of the port controller transitions the connection state of the USB port to an disconnected state in which the connection to the USB port is not made.

5. The semiconductor system according to claim 3, wherein, when the duration of the first predetermined time period elapses, the controller of the port controller transitions the connection state of the USB port to an opposite device confirmation state for confirming whether the opposite device connected to the USB port has a predetermined first function, and when the opposite device confirmation state continues for a predetermined second time, the controller of the port controller transitions the connection state of the USB port to the connected state.

6. The semiconductor system according to claim 1, wherein, when the connection state of the USB port transitions to the connected state, the controller of the port controller a power supply circuit configured to perform at least one of power receiving and power supply.

7. The semiconductor system according to claim 1, wherein the controller of the port controller stops the state machine when the connection state of the USB port transitions to a predetermined first state, and transmits a notification indicating the state machine has been stopped to outside.

8. The semiconductor system according to claim 7, wherein, after the controller of the port controller transmits the notification to outside, the controller of the port controller restarts the state machine from the connection state of the transition destination of the connection state controlled by the port manager, or the connection state of the transition destination of the transition condition controlled by the port manager.

9. The semiconductor system according to claim 7, wherein the controller of the port controller further comprises a register for setting the first state.

10. A semiconductor device comprising:
a state machine configured to realize transition of a connection state in a USB (Universal Serial Bus) port, wherein the connection state in the USB port transitions among 1) a connection confirmation state in which it is confirmed whether or not the opposite device connected to the USB port is electrically connected, 2) a connected state in which the opposite device connected to the USB port is confirmed to be electrically stably connected, and 3) a disconnected state in which the opposite device is confirmed to be disconnected from the USB port and
a controller configured to:
when an opposite device connects to the USB port, control the state machine to transition the connection confirmation state in the USB port to the connection confirmation state,
determine whether the connection confirmation state in the USB port has continued for a first predetermined time period; and
when the controller of the port controller determines that the connection confirmation state has continued for the first predetermined time period, (i) control the state machine to transition the connection state in the USB port to the connected state without receiving, from a port manger, instructions to change the connection state in the USB port to the connected state and (ii) output to the port manager a connected state transition notification that notifies the port manager that the connection state of the USB port transitioned to the connected state.

11. The semiconductor device according to claim 10, wherein the controller further comprises a timer, and wherein the controller measures, using the timer, the first predetermined time period being a duration of a connection confirmation state.

12. The semiconductor device according to claim 11, wherein, when the connection to the USB port is released before the duration of the connection confirmation state elapses the first time, the controller transitions the connection state to an disconnected state in which the connection to the USB port is not made.

13. The semiconductor device according to claim 11, wherein, when the duration of the first predetermined time period elapses, the controller transitions the connection state to an opposite device confirmation state for confirming whether the opposite device connected to the USB port has a predetermined first function, and when the opposite device confirmation state continues for a predetermined second time, the controller transitions the connection state to the connected state.

14. The semiconductor device according to claim 11, wherein, when the connection state transitions to the connected state, the controller a power supply circuit configured to perform at least one of power receiving and power supply.

15. The semiconductor device according to claim 10, wherein the controller stops the state machine when the connection state transitions to a predetermined first state, and transmits a notification indicating the state machine has been stopped to outside.

16. The semiconductor device according to claim 15, wherein, after the controller transmits the notification to outside, the controller restarts the state machine from the connection state of the transition destination of the connection state controlled by the port manager connected to semiconductor device via a bus, or the connection state of the transition destination of the transition condition controlled by the port manager.

17. The semiconductor device according to claim 16, wherein the bus is I2C (Inter-Integrated Circuit) bus.

18. The semiconductor device according to claim 15, wherein the controller further comprises a register for setting the first state.

* * * * *